United States Patent
Lyren et al.

(10) Patent No.: US 10,834,516 B2
(45) Date of Patent: *Nov. 10, 2020

(54) SMARTPHONE PROCESSES A VOICE IN A TELEPHONE CALL TO A FAMILIAR LOCATION

(71) Applicants: Philip Scott Lyren, Bankgkok (TH); Glen A. Norris, Tokyo (JP)

(72) Inventors: Philip Scott Lyren, Bankgkok (TH); Glen A. Norris, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/558,073

(22) Filed: Aug. 31, 2019

(65) Prior Publication Data

US 2019/0387343 A1 Dec. 19, 2019

Related U.S. Application Data

(63) Continuation of application No. 16/271,787, filed on Feb. 9, 2019, now Pat. No. 10,462,595, which is a continuation of application No. 15/406,830, filed on Jan. 16, 2017, now Pat. No. 10,271,153, which is a continuation of application No. 15/178,602, filed on Jun. 10, 2016, now Pat. No. 9,584,946.

(51) Int. Cl.
*H04S 7/00* (2006.01)
*G10L 15/04* (2013.01)
*H04W 88/02* (2009.01)
*G10L 25/81* (2013.01)
*H04M 1/02* (2006.01)

(52) U.S. Cl.
CPC ............ *H04S 7/30* (2013.01); *G10L 15/04* (2013.01); *G10L 25/81* (2013.01); *H04M 1/0202* (2013.01); *H04W 88/02* (2013.01); *H04M 2201/40* (2013.01); *H04S 7/302* (2013.01); *H04S 2420/01* (2013.01)

(58) Field of Classification Search
CPC ............ G10L 19/008; H04S 2400/11; H04S 2400/03; H04S 2420/01; H04S 5/00; H04M 3/568
USPC .... 381/17, 23, 303; 379/93.21, 158, 202.01, 379/203.01, 204.01
See application file for complete search history.

(56) References Cited

U.S. PATENT DOCUMENTS

2010/0316232 A1* 12/2010 Acero .................. H04M 3/568
381/92

* cited by examiner

*Primary Examiner* — Alexander Krzystan

(57) ABSTRACT

A smartphone analyzes prior telephone calls and determines a familiar sound localization point (SLP). The smartphone processes a voice in a telephone call so the voice externally localizes to a user of the smartphone as binaural sound from the familiar SLP.

15 Claims, 13 Drawing Sheets

1000A

| Sound Source | Sound Type | ID | SLP | Transfer Function or Impulse Response | Date | Duration |
|---|---|---|---|---|---|---|
| Telephone Call | Speech | Bob (human) | SLP2 | HRIR | 01/01/16 | 53 sec |
| Internet | Speech and Music | Ad | SLP64 | Internal (Mono) | 01/01/16 | 30 sec |
| Smartphone Program | Speech | Hal (IPA) | SLP1 | HRTF | 01/01/16 | 38 sec |
| Cloud Memory (Movies Folder) | Speech, Music, Sound Effects | E.T. | SLP50-SLP58 | HRTFs | 01/02/16 | 2 hours 4 min |
| Satellite Radio | Speech | Howard Stern | SLP16-SLP20 | HRTFs | 01/02/16 | 22 min |

| Sound Source (Telephone Calls) | Sound Type | SLP |
|---|---|---|
| Tel: +852 6343 0155 | Speech and Non-Speech | SLP1: (1.0 m, 10°, 10°) |
| Bob | Speech and Music | Speech: SLP2<br>Music: SLP3 – SLP5 |
| Charlie | Speech and Non-Speech | SLP6: Internal |
| Teleconference (Multi-Party) | Speech and Non-Speech | Speaker1: SLP20<br>Speaker2: SLP21<br>Speaker3: SLP22<br>Speaker4: SLP23 |
| Unknown | Speech and Non-Speech | SLP30: Internal (mono only) |

| Sound Source (Miscellaneous) | Sound Type | SLP |
|---|---|---|
| BBC Archives | Speech and Non-Speech | Speech: SLP30 - SLP35<br>Music: SLP40<br>Other: Internal |
| YouTube | Music Videos | SLP45 |
| Advertisements | Speech and Non-Speech | Internal<br>(Block external localization) |
| Appliances | Speech and Non-Speech | Speech: SLP50<br>Non-Speech: SLP51 (warnings/alerts)<br>Non-Speech: Internal (Other) |
| Intelligent Personal Assistant (Hal) | Speech | SLP60 |

Figure 10C

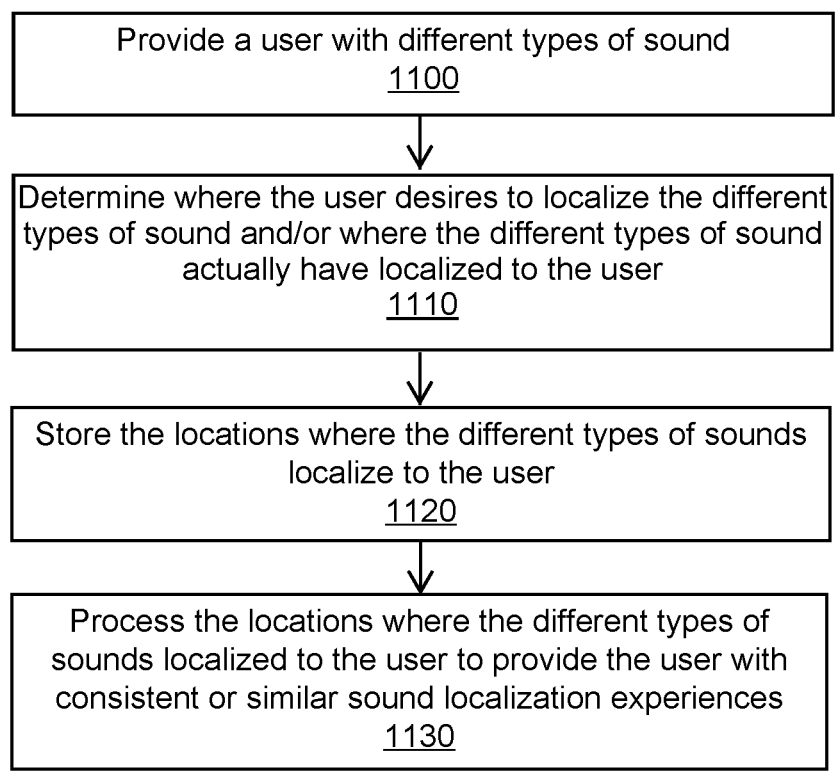

Figure 11

SMARTPHONE PROCESSES A VOICE IN A TELEPHONE CALL TO A FAMILIAR LOCATION

BACKGROUND

Three-dimensional (3D) sound localization offers people a wealth of new technological avenues to not merely communicate with each other but also to communicate with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

BRIEF DESCRIPTION OF THE DRAWINGS

FIG. 10A is a table of example historic audio information for a user in accordance with an example embodiment.

FIG. 10B is a table of example user preferences of a user for localizing a sound source of telephone calls in accordance with an example embodiment.

FIG. 10C is a table of example user preferences of a user for localizing miscellaneous sound sources in accordance with an example embodiment.

FIG. 11 is a method to localize different types of sounds to users in accordance with an example embodiment.

SUMMARY

Figure 1:
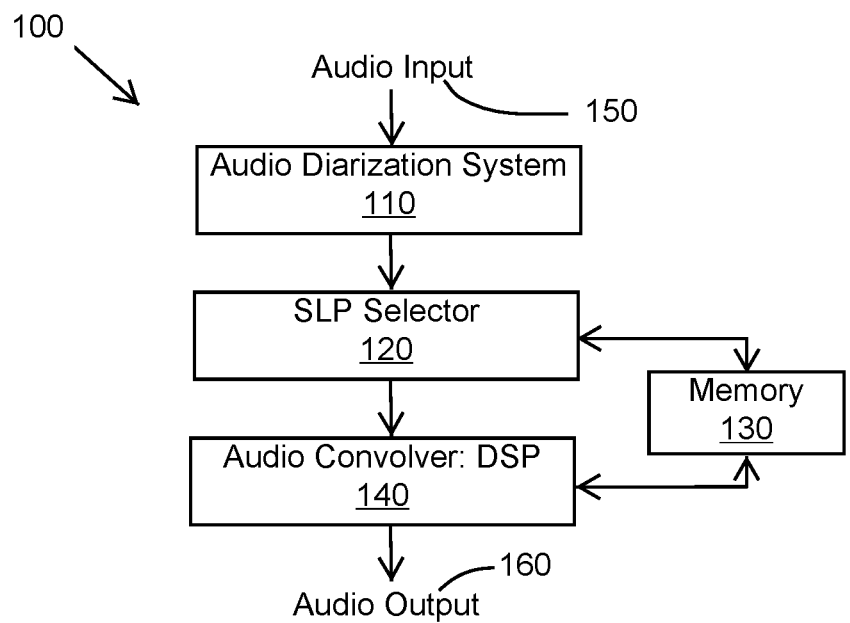
FIG. 1 is a computer system or electronic system that convolves audio input in accordance with an example embodiment.

One example embodiment convolves speech and/or non-speech in an audio input to localize sounds to different locations for a user. An audio diarization system segments the audio input into speech and non-speech segments. These segments are convolved with one or more head related transfer functions (HRTFs) so the sounds localize to different sound localization points (SLPs) for the user.

Other example embodiments are discussed herein.

DETAILED DESCRIPTION

Example embodiments are apparatus and methods that relate to the diarization and convolution of sound.

One example embodiment processes an audio input through an audio diarization system that performs one or more of detecting, segmenting, and clustering the audio input. An audio convolver convolves output from the audio diarization system so speech and/or non-speech segments of the audio input localize to different sound localization points to a user. The user can be provided with binaural sound with sound segments that localize to different sound localization points (SLPs) that are externally located around the user. One or more of these SLPs can also be located inside the head of the user.

By way of introduction, sound localization refers to a person's ability to determine a location or an origin of sound in direction and distance (though the human auditory system has limits in determining direction and distances to some sounds). Sound localization also refers to methods to use artificial or computer generated auditory cues to generate an origin of sound in a virtual three-dimensional (3D) space. Binaural sound (or 3D sound) and some forms of stereo sound provide a listener with the ability to localize sound; though binaural sound generally provides a listener with a superior ability to localize sounds in 3D space. In many instances, a person listening to binaural sound through an electronic device (such as earphones or speakers with cross-talk cancellation) can determine a location from where the sound originates even when this location is away from the person.

Binaural sound can be manufactured or recorded. When binaural sound is recorded, two microphones are placed in or near human ears or placed in ears of a dummy head. When this binaural recording is played back (e.g., through headphones or earphones), audio cues in the recorded sound cause the listener to perceive an audio representation of the 3D space where the recording was made. Binaural sound is quite realistic, and the listener can localize sources of individual sounds with a high degree of accuracy.

Binaural sound typically delivers two types of localization cues: temporal cues and spectral cues. Temporal cues arise from an interaural time difference (ITD) due to the distance between the ears. Spectral cues arise from an interaural level difference (ILD) or interaural intensity difference (IID) due to shadowing of sound around the head.

A person hearing the spatial auditory cues can localize sound or estimate a location of a source of the sound. In some instances, a listener can externalize and localize a sound source in binaural sound to a point and experience the sound as indistinguishable from a real-world sound source occurring in his physical environment.

Although stereo sound offers some degree of sound localization, stereo sound and binaural sound are different. As explained in WIKIPEDIA, the term "binaural sound" and "stereo sound" are frequently confused as synonyms. Conventional stereo recordings do not factor in natural ear spacing or "head shadow" of the head and ears since these things happen naturally as a person listens and experiences his or her own ITDs (interaural time differences) and ILDs (interaural level differences). As a general rule, binaural sound accommodates for one or more ITDs, ILDs, natural ear spacing, head shadow, and room impulse responses. More specifically, sound signals are modified as they travel from the original source and interact with the human anatomy and surrounding environment. These modifications encode the location of the original source and can be captured as an impulse response. The impulse response for a human in a free-field environment (without modification due to a room environment) is called a head-related impulse response (HRIR), and it represents impulse responses from a sound source to two ears. A HRTF is a Fourier transform of a HRIR.

Binaural sound spatialization can be reproduced to a listener using headphones or speakers, such as with dipole stereo (e.g., multiple speakers that execute crosstalk cancellation). Generally, binaural playback on earphones or a specially designed stereo system provides the listener with a sound that spatially exceeds normally recorded stereo sound since the binaural sound more accurately reproduces the natural sound a user hears. Binaural sound can convincingly reproduce the location of sound behind, ahead, above, or around the listener. Further, binaural sound can be recorded (such as recorded with two microphones placed in ears of a person or dummy head) or machine made or modified with a computer program.

Sound can also be processed and moved by adjusting or changing ITDs and ILDs. A sound can also be localized or moved by convolution with a HRIR or HRTF (e.g., a HRTF pair of a listener). For example, mono sound can be convolved with a person's HRIRs or HRTFs to generate binaural sound that is individualized for the person. The HRIRs describe how to alter the sound source before the sound is provided to the ears of the listener. For example, convolving with HRTFs can join a sound to a position around a listener, and convolving with other impulse responses (e.g. Room Impulse Responses) can join a sound to a type of room or place.

Sound localization through the use of electronic devices offers people a wealth of new technological avenues to not merely communicate with each other but also to communicate with electronic devices, software programs, and processes. This technology has broad applicability in augmented reality (AR), virtual reality (VR), audio augmented reality (AAR), telecommunications and communications, entertainment, tools and services for security, medicine, disabled persons, recording industries, education, natural language interfaces, and many other sectors.

As this technology develops, many challenges exist with regard to how sound localization through electronic devices integrates into the modern era. The implementation of binaural sound with electronic devices creates technical problems when used in the field of telecommunications. Some of these problems are addressed and solved with example embodiments.

By way of example, multiple different voices or speakers can be present in an audio input, such as multiple voices in a telephone call, a teleconference call, an archived radio or television broadcast, a movie or video, a computer game, or other application or situation. When the audio input is convolved with a single pair of HRTFs, then the entire audio input will externally localize to a single sound localization point (SLP) to the listener, creating a problem since the sound is not natural. For example, if Alice localizes to a SLP the sound of a conference call with Bob and Charlie, then both Bob's voice and Charlie's voice will localize to one location. Alice can become confused as to who is speaking because, unlike a real life situation, both voices emanate from one location. Example embodiments solve this technical problem. For example, different voices or different speakers are convolved to different locations around the listener.

Example embodiments solve other technical problems as well. Consider an example in which audio input includes both music and one or more voices. This situation creates a problem since the music and the voice or voices appear to the listener to originate from a single location. Example embodiments solve this technical problem. For example, the music is convolved to localize to one or more SLPs (e.g., left and right audio channel SLPs), and the voice or voices are convolved to localize to another SLP.

Example embodiments divide or segment an audio input into different sounds or sound segments, such as dividing the audio input into different speech segments (e.g., one segment for each speaker or each voice) and different non-speech segments (e.g., one segment for music, one segment for background noise, etc.). Each of these segments can be convolved with a different pair of transfer functions (such as HRTFs) or impulse responses (such as HRIRs). The different sounds can be positioned around the listener to provide a richer, fuller, more realistic soundscape.

In an example embodiment, different segments can be convolved with different RIRs or BRIRs, and RIRs or BRIRs can be removed from some segments and remain unaltered on other segments. For example, a user may wish to convolve segments that include dry anechoic machine-made speech of an IPA or alert sounds with a BRIR consistent with the user's physical location so that the voices of the IPA and alerts sound more physical or realistic. The user may wish to leave the segment that includes the alerts unchanged so that the alert's sound color contrasts with the other sounds in his environment. This contrast can make the alerts more noticeable.

Consider an example in which a motor repairman includes his IPA on a telephone call with a client because his IPA is an expert in electric motor repair. The outgoing sound of his IPA is convolved with the RIR of the repairman's office so that his client is not distracted by the anechoic voice of the IPA.

Consider an example in which a user is on a multi-segment call with two friends in which one friend's voice has a moderate amount of reverberation and one friend's voice has almost no reverberation. The sound localization system (SLS) executes a rule-set to externally localize lower-reverberation segments closer to the user, to externally localize segments with higher reverberation farther from the user, and to internally localize segments that originate from known locations for which the user has access to RIRs in order to minimize reverberation.

Another technical problem with binaural sound is determining where to localize sounds for the listener. For example, should a sound be internally localized to the listener or externally localized to the listener? If a sound is externally localized, where should the sound be placed with respect to the listener? How are these determinations made? What if different listeners want to localize a particular sound to different SLPs? Additionally, listeners presented with many different sounds and sound types from many different sources throughout the day may desire a familiar, consistent, and/or organized audio experience with respect to sound placement according to the sound type, the user's location, activity, preferences, and other factors.

These questions show but a few examples of the technical problems that example embodiments address in the field of telecommunications and other technical fields concerned with sound localization. Example embodiments offer solutions to many of these challenges and assist in providing technological advancements in methods and apparatus using electronic devices and sound localization.

An example embodiment determines where to localize sound for a listener. Consider an example embodiment that provides many binaural sounds from many sources. The example embodiment selects one or more SLPs that are familiar or expected to the listener without requiring the listener to select these SLPs. For example, a SLS for the listener determines that the listener wants music to localize to an azimuth of +30°, voices for a telephone call to localize to an azimuth of −30°, warnings or sounds from appliances to localize to a single or same location behind the listener, voices of an intelligent user agent to localize above the listener or inside the head of the listener, etc.

FIG. 1 is a computer system or electronic system 100 that convolves audio input in accordance with an example embodiment. The system includes an audio diarization system 110, a sound localization point (SLP) selector 120, memory 130, and an audio convolver 140 (shown by way of example as a digital signal processor or DSP).

The system 100 obtains, receives, or retrieves audio input 150 that is provided to the audio diarization system 110. By way of example, the audio input includes, but is not limited to, monaural sound, stereo sound, binaural sound, streaming audio, archived audio (such as radio or television archived broadcasts), telephone calls, movie or video sounds, computer game sounds, software application sounds, live audio captured or supplied by a user or computer program or electronic device, and other sources of audio input.

The audio diarization system 110 executes speaker diarization on the audio input. Speaker diarization (aka, speaker diarisation) is a process that divides audio input into segments according to speaker identity. For audio input with voices, speaker diarization combines speaker segmentation and speaker clustering to determine who spoke, when they spoke, and when they did not speak.

Speaker diarization can determine general speaker identity, such as labeling a voice in the audio input as "Speaker 1" and determining when the speaker speaks. Speaker diarization can also determine more specific information with regard to speaker identity, such as identifying that a voice in audio input belongs to a known voice (such as Albert Einstein) and further determining when Albert Einstein speaks in the audio input.

Speaker diarization can be actioned alone or with one or more other audio systems, such as combining an audio diarization system with a speaker recognition system to verify, authenticate, or identify a person. As another example, the audio diarization system executes with an acoustic fingerprint system to verify, authenticate, or identify a sound.

In an example embodiment, the audio diarization system 110 receives or obtains the audio input 150 and analyzes this audio input to identify who spoke when (for speech segments) and/or what sounds occurred when (for non-speech segments). In order to perform this identification, the audio diarization system 110 divides the audio input into speech segments and non-speech segments, such as one or more of background noise, silence, music, and other non-speech sounds. For example, for speaking events or speech segments, the audio diarization system 110 determines when speech originates from an established or known speaker, a different, or a new speaker and determines speaker boundaries, such as when a speaker begins to talk, when a speaker stops talking, and when a speaker changes. The audio diarization system can also locate and determine boundaries for the non-speaking events or non-speech segments, such as determining when music starts and stops, silence starts and stops, noise starts and stops, etc.

The audio diarization system 110 can operate with little or no information or knowledge regarding the content of the audio input 150, such as executing without knowing an identity of speakers or voices or other sounds in the audio input, a number of different speakers or voices or sounds in the audio input, a duration or structure of the audio input, and other information.

The audio diarization system 110 can also operate with information or knowledge regarding the content of the audio input 150. For example, the audio diarization system is provided with or determines a number of speakers, such as a known number of speakers in a radio or television archive broadcast. As another example, the audio diarization system is provided with audio samples, voiceprints/voice identifications (IDs) or voice models of the speakers, or data that indicates cues or time-codes and durations for speaking or sound events, and speaker labels or identities of these speakers. This information assists the audio diarization system in identifying speakers in the audio input. Other information can be provided to assist in segmentation, clustering, and other tasks.

The audio diarization system 110 can label speakers and sounds, including when an identity of a speaker or sound is known or not known. For example, in a teleconference call, the audio diarization system labels unknown speakers with a label, such as Speaker 1, Speaker 2, Speaker 3, etc. Other sound labels can also be applied, such as those consistent with speaker diarization protocols.

The audio diarization system 110 can execute one or more different audio diarization modeling techniques. These modeling techniques include, but are not limited to, a Gaussian mixture model (GMM), Hidden Markov Model (HMM), Bayesian information criterion (BIC), Bayesian estimation and machine learning methods, Variational Bayes, Eigenvoice modeling, cross likelihood ratio (CLR) criterion, et al.

By way of example, one technique (known as the bottom-up technique) executes segmentation and then clustering. This technique splits the audio into successive clusters and merges redundant clusters until each cluster corresponds to a speaker. For example, the technique divides the audio input into a number of segments and then iteratively chooses clusters that closely match to repeatedly reduce an overall number of clusters. Clusters can be modeled with GMM in which a distance metric identifies closest clusters. The process repeats until each speaker has one cluster.

As another example, one technique (known as the top-down technique) models the audio input with a first speaker model and then successively adds more speaker models for each different speaker. A single cluster for the audio input is iteratively divided until a number of clusters represent the number of speakers.

Consider an example in which the audio diarization system 110 executes or processes temporal distance metrics to determine speaker change locations, such as temporal locations when one speaker stops speaking and another begins speaking. For a particular location in the audio input, the system determines a statistical similarity of the audio on each side of this location and then determines segment boundaries based on a distance curve for this statistical similarity. Consider another example in which the audio diarization system executes or processes heuristic rules to determine the speaker change locations.

In an example embodiment, an audio diarization system that receives binaural sound as input can examine binaural audial cues to help determine segments according to sound type and in addition can create segments according to other criteria in addition to sound type such as spatial information. For example, a segment can include specifically the sounds determined to originate from a distance greater than three meters. A segment composed of distant source sounds can organize many distant sounds together into one or more segments.

For example, a segment composed of distant sounds can be localized to, for example, a single point to lessen the user's distraction by the distant sounds. As another example, one segment can include specifically the sounds occurring at points relative to the listener with azimuth coordinates greater than +90° and less than +270°. The segment can be localized above the head of the user so that the user knows that sound he might hear behind him is a real sound from his environment.

The SLP selector 120 selects, assigns, provides, and/or determines a sound localization point for each of the segments or clusters assembled by the audio diarization system 110. These points can be external locations to a listener (such as sound perceived as originating from a location that is proximate to but away from the listener) and internal locations to the listener (such as sound perceived as originating from a location inside the head of a listener).

The SLP selector can assign one or more SLPs to different speakers and sounds. For example, each speaker and/or each sound is assigned a unique SLP. As another example, two speakers and/or sounds are assigned a single SLP. As another example, one speaker and another sound are assigned a single SLP, and another speaker is assigned a different SLP. As another example, one speaker is assigned a unique SLP, and another speaker is assigned two unique SLPs.

By way of example, sound can be convolved with a pair of HRTFs. A HRTF is a function of frequency (f) and three spatial variables, by way of example (r, θ, φ) in a spherical coordinate system. Here, r is the distance from a listener to a recording point where the sound is recorded, or a distance from a listening point where the sound is heard to an origination or generation point of the sound; θ (theta) is the azimuth angle between a forward-facing user at the recording or listening point and the direction of the origination or generation point of the sound relative to the user; and φ (phi) is the polar angle, elevation, or elevation angle between a forward-facing user at the recording or listening point and the direction of the origination or generation point of the sound relative to the user. By way of example, the value of (r) can be a distance (such as a numeric value representing a number of meters) from an origin of sound to a recording point (e.g., when the sound is recorded with microphones) or a distance from a SLP to a listener's head (e.g., when the sound is generated with a computer program or otherwise provided to a listener).

When the distance (r) is greater than or equal to about one meter (1 m) as measured from the capture point (e.g., the head of the person) to the sound source, the sound attenuates inversely with the distance. One meter or thereabout defines a practical boundary between near field and far field distances and corresponding HRTFs. A "near field" distance is one measured at about one meter or less; whereas a "far field" distance is one measured at about one meter or more. Example embodiments can be implemented with near field and far field distances.

In an example embodiment, a SLP represents a location where the person will perceive an origin of the sound. For an external localization, the SLP is away from the person (e.g., the SLP is away from but proximate to the person or away from but not proximate to the person). The SLP can also be located inside the head of the person.

In an example embodiment, a location of the SLP can correspond to the coordinates of one or more pairs of HRTFs. For example, coordinates of or within a SLP zone match or approximate the coordinates of a HRTF. Consider an example in which the coordinates for a pair of HRTFs are (r, θ, φ) and are provided as (1.2 meters, 35°, 10°). A corresponding SLP zone for the person thus includes (r, θ, φ), provided as (1.2 meters, 35°, 10°). In other words, the person will localize the sound as occurring 1.2 meters from his or her face at an azimuth angle of 35° and at an elevation angle of 10° taken with respect to a forward looking direction of the person.

Consider an example in which the audio diarization system 110 segments a television evening news report into three different segments: a voice of a news anchor, a voice of a reporter reporting at a scene of a crime, and background sound recorded at the scene of the crime. The SLP selector 120 assigns SLPs to the three different segments as follows: The voice of the news anchor is assigned to SLP 1 that is located proximate to but away from the listener about one meter in front of a face of the listener at (1.0 m, 0°, 0°). The voice of the reporter is assigned to SLP 2 that is located proximate to but away from the listener about one meter on a right side of the face of the listener at (1.2 m, 30°) 0°. The background sound is located inside the head of the listener at (0 m, 0°) 0°.

The SLP selector 120 couples to or communicates with the audio convolver 140 and provides the audio convolver with the SLP designations. The audio convolver 140 convolves one or more of the different speakers or voices with the SLP designations and outputs the convolved sound as audio output 160. The audio output localizes to the listener to the sound localization points provided by the SLP selector 120.

The SLP selector 120 and/or the audio convolver 140 couples to or communicates with memory or database 130. The memory stores one or more of SLPs (including SLP location and other information associated with a SLP including rich media such as sound files and images), user profiles and/or user preferences (such as user preferences for SLP locations and sound localization preferences), impulse responses and transfer functions (such as HRTFs, HRIRs, BRIRs, and RIRs), information about previous and current phone call and sound localization, information about the state of the user and device (e.g., current time, location, orientation), and other information discussed herein.

Consider an example in which the audio diarization system 110 performs real-time speech and speaker recognition. The system annotates the audio input 150 (e.g., an audio file or streaming audio) with information that provides temporal regions of sources or types of sound (e.g., speech, music, background noise, etc.) included in the audio signal. For example for speech, the system marks where speaker changes occur in the audio input and associates segments of the speech with a previously identified or previously recognized speaker. For instance, the system segments the audio input into file chunks for each unique speaker and/or non-speech sound. The system clusters these file chunks into groups so the audio input is partitioned into homogenous segments according to an identity of the speaker and/or non-speech sound.

Elements of the computer system 100 can be in a single electronic device or spread across multiple electronic devices. For example, a cloud server executes audio diarization and provides this audio to a smartphone that executes SLP selection and audio convolving. As another example, the cloud server executes audio diarization, SLP selection, and audio convolving and provides the convolved signal to the smartphone or other portable electronic device, such as a wearable electronic device that provides augmented reality (AR) and/or virtual reality (VR). As yet another example, the audio input is provided to a handheld portable electronic device (HPED) that executes audio diarization, SLP selection, and audio convolving.

Figure 2:
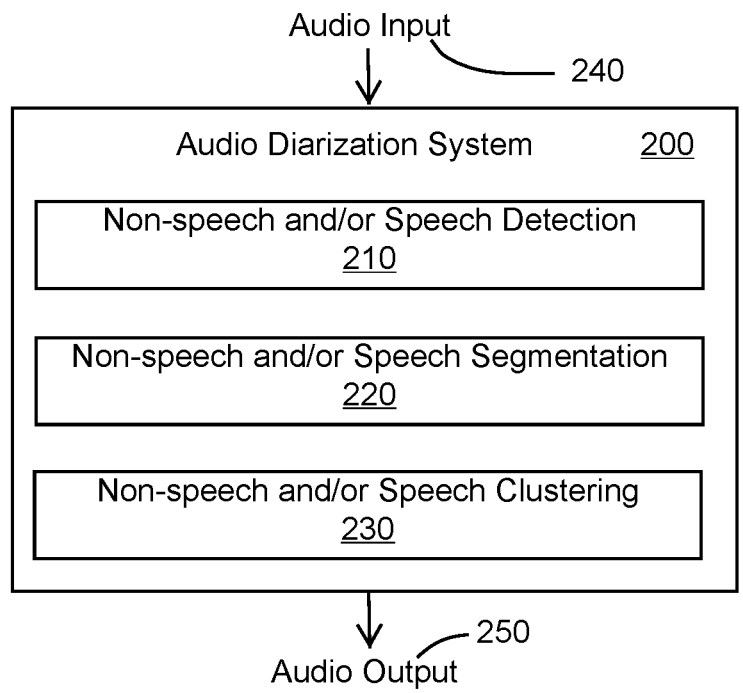
FIG. 2 is an audio diarization system in accordance with an example embodiment.

FIG. 2 shows an example audio diarization system 200 in accordance with an example embodiment. The system 200 includes non-speech and/or speech detection 210, non-speech and/or speech segmentation 220, and non-speech and/or speech clustering 230.

Although the system shows three separate processes of non-speech/speech detection 210, non-speech/speech segmentation 220, and non-speech/speech clustering 230, these processes can be executed individually or independently (such as performing speech detection, then speech segmentation, then speech clustering) or executed simultaneously (such as concurrently performing one or more of speech detection, speech segmentation, and/or speech clustering).

One skilled in the art will appreciate that the audio diarization system 200 can include other processes as well, such as noise reduction. Further yet, these processes can be split or performed at different locations (such as performing speech and non-speech detection on one electronic device and performing speech and non-speech segmentation and/or clustering on another electronic system). Alternatively, these processes can be performed at a single location (such as performing them on an integrated circuit or chip in an electronic device).

At block 210, the audio diarization system 200 receives the audio input 240 and classifies this audio input as being either non-speech audio or speech audio. Non-speech audio includes, but is not limited to, music, silence, background noise, and other sounds. Speech audio includes voices, such as voices of humans or computer-generated voices (e.g., voices in a game, a voice of an intelligent personal assistant (IPA), a voice of a computer program, speech output from a natural language interface, or another type of computer-generated voice) or speech assembled by a computer from human voices or human voice recordings.

Speech activity detection (SAD) analyzes audio input 240 for speech and non-speech regions. SAD can be a preprocessing step in diarization or other speech technologies, such as speaker verification, speech recognition, voice recognition, speaker recognition, et al. SAD can include a GMM based speech activity detector or another type detector (e.g., an energy based detector).

At block 220, the audio diarization system 200 segments, partitions, or divides non-speech audio and/or speech audio into segments (such as homogeneous segments) according to identities of the speakers in the speech audio and sounds in the non-speech audio. For example, the audio diarization system identifies boundary locations for the speech in the audio input (e.g., temporal start and stop locations for speakers in the audio input). Speaker segments, for example, provide locations in a given audio input that define places or locations where the speaker changes. For example, a speaker change point in a teleconference occurs where Alice stops talking and Bob starts talking.

Sound can be segmented using one or more of various techniques, such as model based sound segmentation, metric based sound segmentation, and energy based sound segmentation. Model based sound segmentation executes multivariate Gaussian modeling and BIC modeling. Metric based sound segmentation executes a distance metric to determine if two audio sections are statistically similar or dissimilar. For example, in a sliding window technique, two sliding windows are applied to the audio input to determine dissimilarity between the windows per a log-likelihood metric or distance metric such as a Euclidean distance, Malhalanobis distance, or Kulback-Leiber distance. Speaker boundaries occur at locations where distance scores exceed a predetermined threshold value. Energy based sound segmentation discovers pauses or no-sound locations (aka, silence locations) in the audio input to find speaker or sound segment boundaries.

At block 230, the audio diarization system 200 determines which segments of non-speech and speech belong to a same or single source (e.g., which speech segments belong to a previously identified or previously recognized speaker) and/or a different source (e.g., which speech segments belong to a new speaker). For example, clustering identifies which speaker segments are the same and/or different and can group the clusters (such as providing one cluster for each speaker or each voice). Clustering can also label and/or identify segments of the non-speech and speech. For example, the system labels a non-speech segment as "music 3" and labels a recognized speaker speech segment as "Alice."

The audio diarization system 200 outputs the audio output 250 (e.g., one or more sound tracks or segments).

Figure 3:
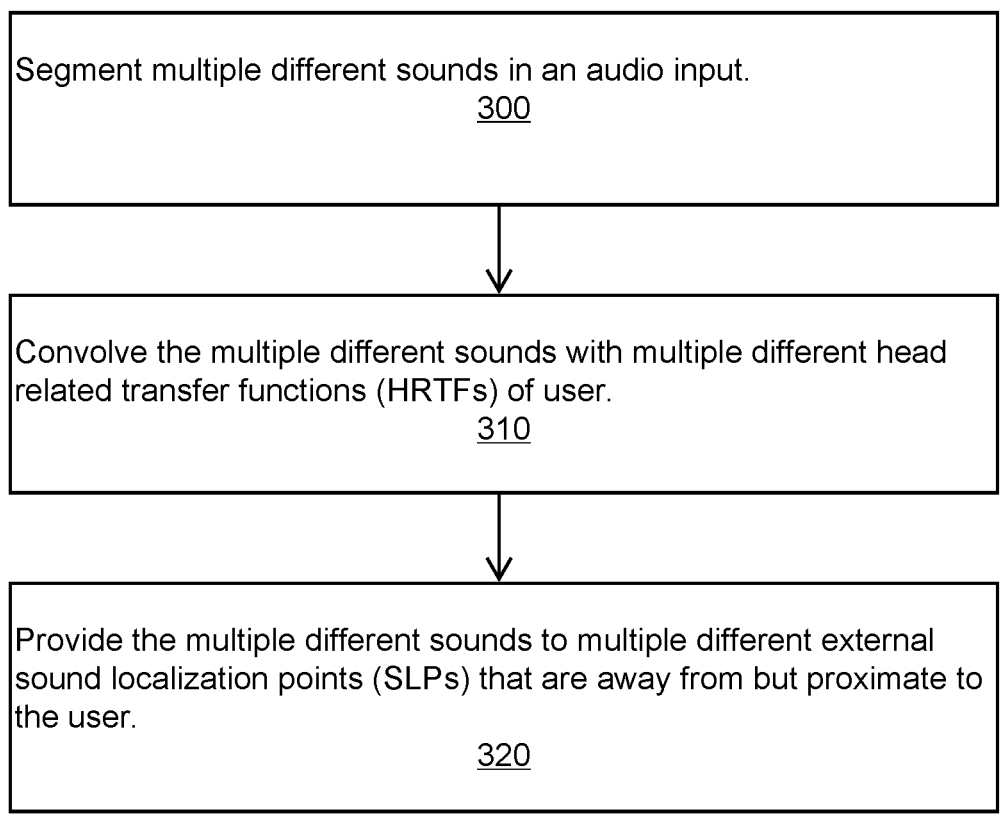
FIG. 3 is a method to localize multiple different sounds to multiple different locations to a user in accordance with an example embodiment.

FIG. 3 is a method to localize multiple different sounds to multiple different locations to a user in accordance with an example embodiment.

Block 300 states segment multiple different sounds in an audio input.

The multiple different sounds can include speech sounds and non-speech sounds. For example, the audio input is a telephone call or conference call with multiple different speakers. As another example, the audio input is a television or radio broadcast with multiple different speakers and multiple different sounds (such as music, noise, environmental sounds, etc.). As another example, the audio input is a telephone call with multiple different speakers and multiple different sounds (such as background music or background noise).

For example, in a telephone call, a computer system or electronic device segments each voice of a speaker that is talking to or will talk to a party to the telephone call. The voices can be segmented during the telephone call (e.g., after the telephone call commences, before the telephone call commences, or when the telephone call commences).

For example, the computer system or electronic device segments speakers or voices in a television or radio show and assigns a different label to each voice or each speaker.

Block 310 states convolve the multiple different sounds with multiple different head related transfer functions (HRTFs) of user.

For example, the computer system or electronic device convolves each of the voices with a different pair of HRTFs of a listener of the audio input. In this manner, each voice can localize to a different external sound localization point around or near the user. Alternatively, one or more of these voices is not convolved with a HRTF but provided as stereo or mono sound to the user so the voice localizes inside the head of the user.

Block 320 states provide the multiple different sounds to multiple different external sound localization points (SLPs) that are away from but proximate to the user.

Voices of the speakers can be provided to the user in binaural sound through speakers, headphones, earphones, or another electronic device with two speakers (e.g., a head mounted display, heads up display, or wearable electronic glasses). Alternatively, one or more voices of the speakers can be provided to the user in monaural sound or stereo sound.

Each different SLP can be associated with one or more transfer functions or impulse responses (e.g., each SLP is associated with a different HRTF or HRIR, or BRIR). Alternatively, a SLP can be associated with an interaural time difference (ITD) and/or interaural level difference (ILD). As another example, a SLP is located inside a head of the user (e.g., a SLP in which the voice is provided to the user in monaural sound or stereo sound).

Consider an example in which Bob and Charlie place an internet telephony call to Alice using a Voice Over Internet Protocol (VoIP) service such as SKYPE. Bob and Charlie place this telephone call from Bob's laptop computer that has a single microphone. Alice's contact list includes Bob and Charlie, and her computer includes voice samples of Bob and Charlie from previous telephone calls with them. Alice answers the telephone call on her smartphone, and a sound localization system (SLS) executing on her smartphone recognizes the voices of Bob and Charlie based on a comparison with the voice samples. The SLS retrieves a SLP and corresponding pair of HRTFs designated for Bob, and a SLP and corresponding pair of HRTFs designated for Charlie. The voices of Bob and Charlie are segmented, convolved with the respective HRTFs, and provided to Alice so the voices localize at the designated SLPs.

As another example, a dry computer-generated voice without reverberation is convolved with a particular BRIR to give the sound a reverberation consistent with other segments localized to the user.

Figure 4:
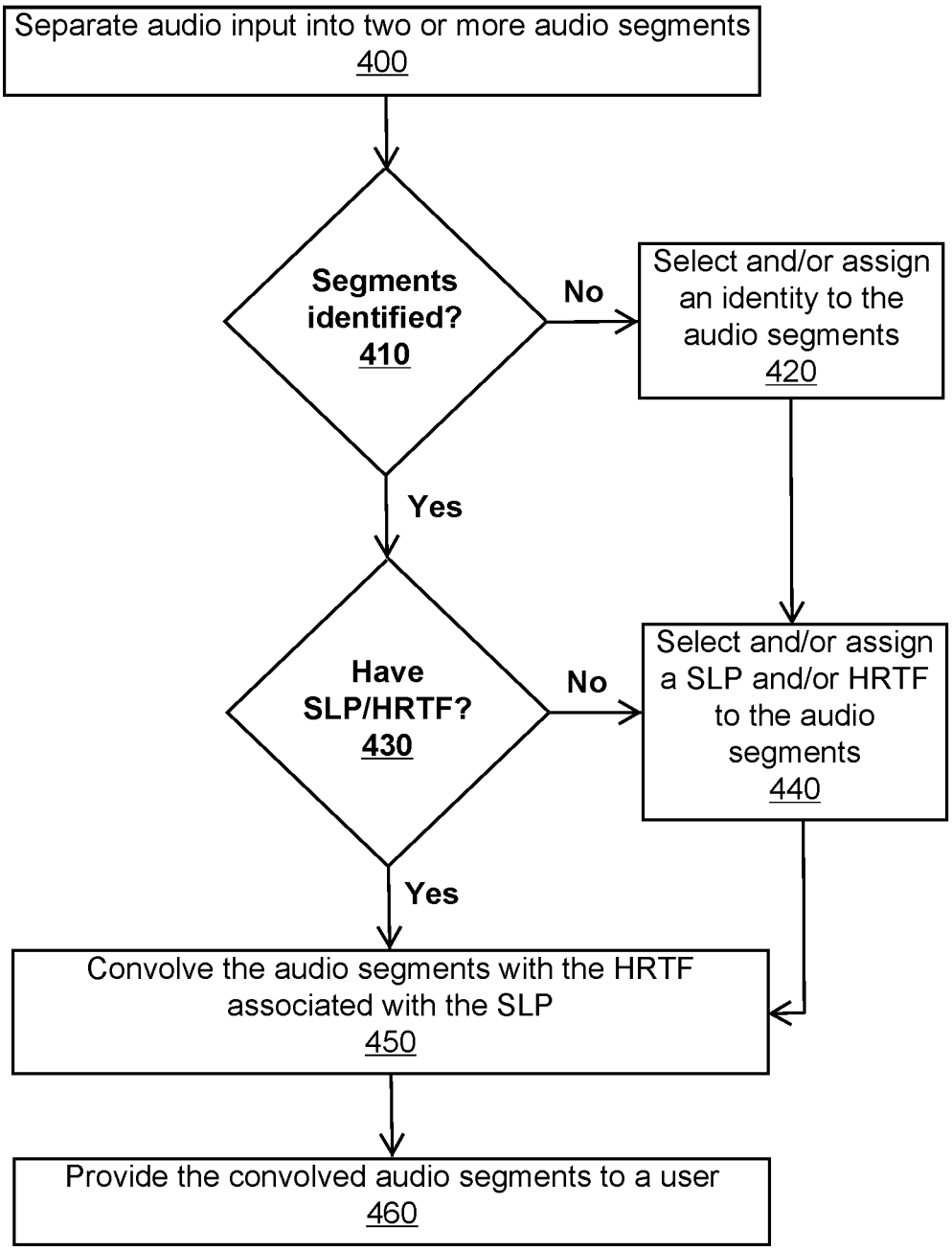
FIG. 4 is a method to convolve segments of an audio input in accordance with an example embodiment.

FIG. 4 is a method to convolve segments of an audio input in accordance with an example embodiment.

Block 400 states separate audio input into two or more audio segments.

The audio input is separated into two or more audio segments, channels, or tracks based on, for example, speech or voices, music, noise, or other sounds desired to be filtered or convolved. For example, voices of different speakers are parsed, divided, identified, recognized, segmented, or separated from an audio input.

Consider an example in which an electronic device executes an audio segmenting process that segments audio input into two or more acoustic classes or audio events, such as music, clean speech, speech with noise, speech with music, etc. Feature extraction is based on CHROMA coefficients, spectral entropy, Mel Frequency Cepstral Coefficients (MFCC), and/or HMM frame classification.

Consider an example in which an audio diarization system segments and clusters an audio stream into homogenous regions according to speaker identity. The system converts the audio input (such as a Waveform Audio File Format or WAV file or other audio file format) into MFCC features from which multiple features are extracted for each frame and stored as feature vectors. Audio scene change is detected from the feature vector using, for example, Bayesian Information Criterion (BIC). For example, the results are clustered such that speech segments from a same or single person or voice are combined into one segment.

Block 410 makes a determination as to whether the audio segments are identified.

For example, a determination is made as to whether the divided audio segments are recognized or identified. For instance, an audio segment may be new and not recognized, such as being a voice of an unknown speaker speaking for a first time in the audio segment. Alternatively, the audio segment is identified or recognized, such as being a voice from a known speaker, such as a speaker having a record in a database accessible to the user.

If the answer to this determination is "no" flow proceeds to block 420 that states select and/or assign an identity to the audio segments.

Consider an example in which an electronic device executes an audio diarization system and/or a voice recognition system, and the system that executes includes voice recognition and/or speaker identification. The system determines whether voices in the audio input are previously identified. For example, the system determines whether a person has already spoken in the current audio input or in a previous audio input (e.g., the system saves audio segments or fingerprints/voiceprints of speakers for subsequent identification). When the speaker is not identified, the system provides a label or identity to the speaker (such as labeling an unknown speaker as "Speaker 1"). Later, when this speaker speaks again, the system recognizes and identifies this speaker or identifies the voice as one that has been established or identified (such as recognizing and identifying that Speaker 1 is speaking again). This recognition or identification is used to attribute or classify and designate the voice or sound to a respective established segment or new segment.

If the answer to this determination is "yes" flow proceeds to block 430 that makes a determination as to whether the audio segments have a SLP and/or HRTF.

If the answer to this determination is "no" flow proceeds to block 440 that states select and/or assign a SLP and/or HRTF to the audio segments.

If the answer to this determination is "yes" flow proceeds to block 450 that states convolve the audio segments with the HRTF associated with the SLP.

Block 460 states provide the convolved audio segments to a user.

One or more sound localization points (SLPs) can be assigned or designated to one or more audio segments. For example, a SLP is assigned to each segment or assigned to a portion of the segments. These SLPs can be pre-assigned, predetermined, or known before the system begins to process the audio input. Alternatively, these SLPs can be determined and assigned when the audio input is being processed (e.g., the system assigns SLPs to voices in a telephone call while the parties are talking during the telephone call).

Consider an example in which Alice's user preferences include a preference for the voice of Bob in a telephone call to convolve to SLP 1 (e.g., SLP 1 specifies a location in a spherical coordinate system at (1.2 m, 15°, 10°) for where Alice hears the voice of Bob when his voice is convolved with a pair of HRTFs saved as HRTF-1). Her user preferences also include a preference for the voice of Charlie to convolve to SLP 2 (e.g., SLP 2 specifies a location in a spherical coordinate system at (1.2 m, −15°, 10°) for where Alice hears the voice of Charlie when his voice is convolved with a pair of HRTFs saved as HRTF-2). Alice receives a telephone call from Bob. The audio diarization system recognizes the voice as belonging to Bob when he speaks, retrieves a SLP assigned to Bob, SLP 1, from memory as the location to localize his voice to Alice, and convolves Bob's voice with HRTF-1. During this call, Alice receives a call from Charlie, and she adds him to the call with Bob. When Charlie speaks, the audio diarization system recognizes the voice of Charlie, retrieves SLP 2 (a SLP designated to Charlie) from memory as the location to localize his voice to Alice, and convolves Charlie's voice with HRTF-2.

Consider an example in which a BRITISH BROADCASTING CORPORATION (BBC) audio archive includes three speakers: a host and two guest speakers. Alice activates the audio archive to play on her headphones, and triggers the following events: Her intelligent personal assistant (Hal) determines from historic listening habits that Alice prefers to listen to audio recordings in binaural sound.

Hal instructs an audio diarization system to preprocess the audio archive and determines that the audio has three voices (the host and two guest speakers). Hal designates the voice of the host to internally localize to Alice, designates the voice of the first guest speaker to localize at (1.1 m, 30°, 15°), and designates the voice of the second guest speaker to localize at (1.1 m, −30°, 15°). Hal selects a SLP for each segment, retrieves a HRTF that corresponds to a segment, and provides the HRTFs for the segments to an audio convolver. As the BBC audio archive begins, the three sound segments (corresponding to the three different voices of the host, the first guest speaker, and the second guest speaker) are convolved with the retrieved HRTFs. The BBC audio archive plays through Alice's headphones with the voices localized to the locations that Hal designated.

Figure 5:
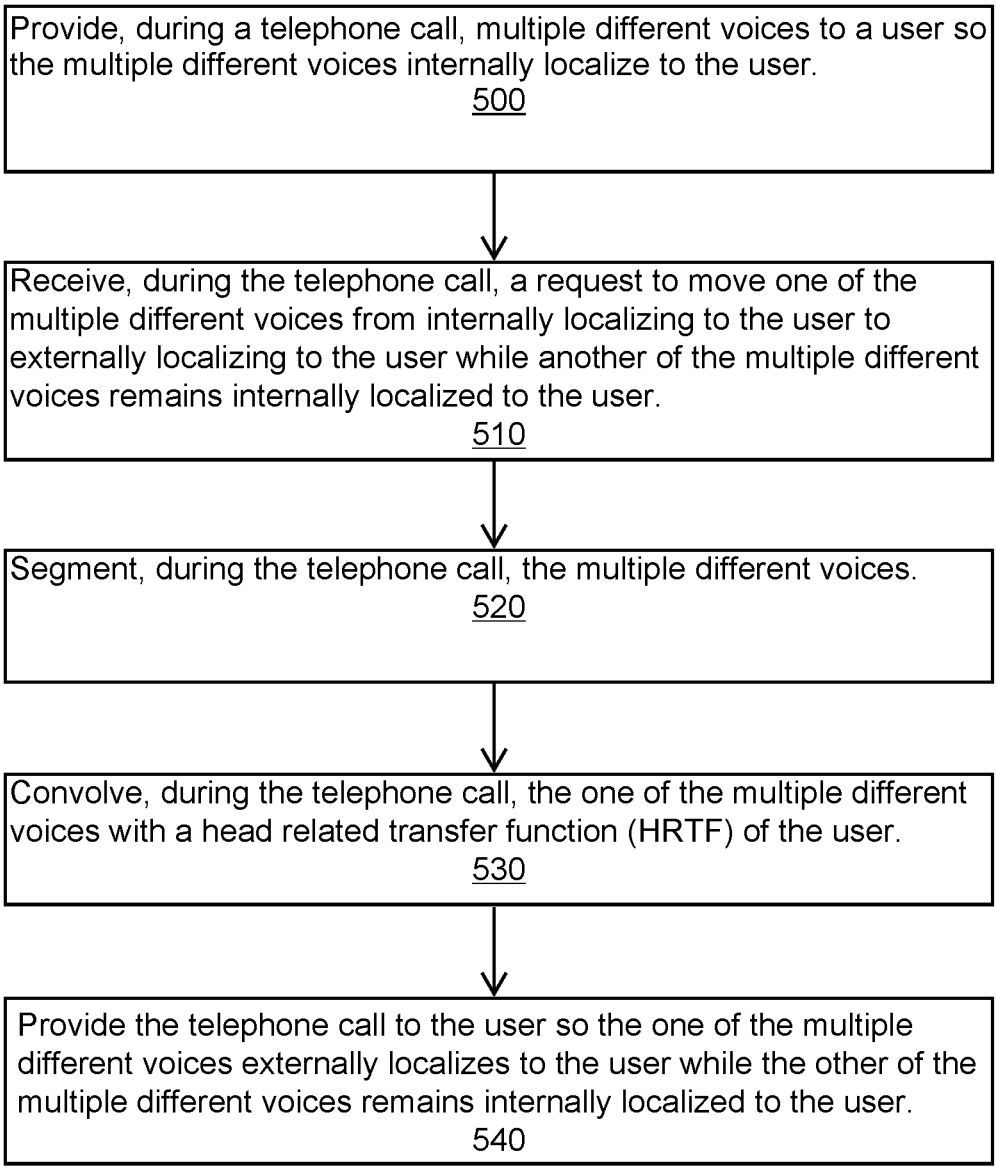
FIG. 5 is a method to move voices during a telephone call from internally localizing to externally localizing in accordance with an example embodiment.

FIG. 5 is a method to move voices during a telephone call from internally localizing to externally localizing in accordance with an example embodiment.

Block 500 states provide, during a telephone call, multiple different voices to a user so the multiple different voices internally localize to the user.

For example, the voices are provided to the user in monaural sound or stereo sound. The telephone call can also include other sounds (such as music and background noise). For instance, a user talks to more than one person on a conference call, and one of the participants has music playing at his or her location. Alternatively, a group of people calls the user from their laptop computer, and noise exists in the background.

Block 510 states receive, during the telephone call, a request to move one of the multiple different voices from internally localizing to the user to externally localizing to the user while another of the multiple different voices remains internally localized to the user.

The request can originate from the user or a person, an intelligent personal assistant (IPA), an intelligent user agent (IUA), a software program, a process, or an electronic device.

Consider an example in which a user is on a conference call and hears the voices of several speakers intracranially or internally localized. The user desires to localize the voices to different locations around him so it is easier for the user to distinguish or determine who is talking. During the conference call, the user provides a verbal command that causes an instruction to move one or more of the voices from internally localizing to externally localizing.

Block 520 states segment, during the telephone call, the multiple different voices.

In response to the request, a computer system or electronic device segments, detects, extracts, separates, divides, or identifies one or more of the multiple different voices.

Consider an example in which an example embodiment executes hardware-based signal analysis that processes the sound to increase the speed and accuracy of segmentation decisions. For example, a digital signal processor (DSP) executes one or more of segmentation analysis, diarization, convolution, and deconvolution.

In one example embodiment, an audio diarization system segments the multiple different voices according to a segmentation scheme prearranged between the calling parties. For example, the audio diarization system executes or processes a protocol agreed upon by the devices or software clients of the calling parties to identify segments in audio transmissions or outgoing streams of audio. Segment identity or information is encoded according to the protocol and is shared between each user so that the selected voice(s) or segments can be parsed, isolated, or identified and moved per a request.

In one example embodiment, voice recognition executes together with diarization to identify a speaker in an incoming phrase of speech in order to establish a segment and/or assign the incoming phrase to an established segment of an incoming stream of voices.

Consider an example in which a user receives a call from friends Alice & Anne, and identical twins Bob & Bill gathered at Alice's house. The user's segmentation system is able to distinguish Alice's voice from Anne's voice. The system cannot reach the certainty threshold required to distinguish between Bill's segment and Bob's segment. Performing additional analysis to distinguish the male voices with certainty results in unacceptable delay of the playing of the male voices as well as occasional errors in segmentation between the female voices. Therefore, resources are prioritized to achieve consistent and correct segmentation for Alice and Anne. Samples determined to include the voice of Bill or Bob are not distinguished, but attributed to a single segment without expending further resources to distinguish between the two voices. The result is that the user hears each of the four people without confusing delay, and hears Alice and Anne without interruption or error at the respective designated SLPs. The user hears Bill and Bob clearly but without localization or at a common SLP, and overall consistency of user experience is maintained by forgoing segmentation of the similar sounding boys.

Segments can be played without adherence to a common time-code, can be played at unequal or varying speeds, and/or some segments can be played later than other segments. The ability to delay or slow the playback of a segment can assist in rationing processing resources in order to provide prioritization of one segment over another. By way of example, prioritization can be based on segmentation speed, accuracy, voice recognition or voice model calculation, sound ID or acoustic fingerprint calculation, convolution, deconvolution, filtering, or other time-dependent processing-intensive tasks. For example, if one segment is prioritized in the segmentation process, then the audio frames determined as not belonging to the priority segment can be delayed and/or processed with a lower priority.

In another example embodiment, the audio diarization system executes one or more of detecting voices, identifying voices, segmenting voices, and clustering voices before the action is requested. For example, before a request is made to move a voice from internally localizing to externally localizing, the audio diarization system operates on a recorded file of the incoming sound up to a recent moment.

In an example embodiment, the audio diarization system can also execute one or more of creating and improving models of various characteristics of segments, detecting voices or sounds, identifying voices, comparing voices to known voices in a call log or contact list, segmenting the voices, and clustering the voices. These actions can be executed in anticipation of a request to move a voice. These actions can also be executed as a prediction that such a request will be made or as a prediction that identification, segmentation, and/or clustering will be required or requested at some point during the listening or in a future listening to a source that includes one of the segments. These actions can be performed even if the voices are provided to the user in monaural or stereo sound.

For example, an audio diarization system segments each call and each audio source for a duration of a training period, such as several minutes, several hours, several days, or several weeks. The system creates and refines models for sounds played to the user or received by the system, such as calls and sounds that the user does and does not localize. During the training period, due to refinement from multiple calls and playing multiple other sound sources, an increase occurs in the quality of the models built to identify various voices, sound types, sounds, or segments, and an increase in the accuracy of the models in identifying the various sounds. The system can refer to the saved mature models to process future calls for which the user or an electronic device requests segmentation and/or localization.

Consider an example where a user at a cocktail party desires to concentrate on a particular one of the voices and can disregard the others and his HPED assists in realizing the "cocktail party effect." The user indicates to the system a particular voice that the user desires to highlight, and the particular voice may or may not be one that is currently localizing. For example, the user makes the indication with a command such as a gesture or voice command such as, "clarify current voice." In response to the command, the system can enhance the loudness or clarity of the voice/segment. The system can also enhance the volume or clarity of other voices/segments, such as enhancing sounds in order to provide audible contrast. Segments of less interest can be muted, paused, blurred, muffled, or played in a lower volume or as lower resolution sound streams. This action can assist the user in concentrating on a particular voice or segment.

Consider the example above in which one or more segments are localized to the user. The user has a head or gaze tracking system, and he selects the segment of interest by turning his head or gaze toward the SLP of the segment. Alternatively, a user's head or body orientation is monitored by or fixed to a device he has or wears, and the user turns his head or body to the SLP of interest. For example, the user issues a voice command (such as "clarify") when the user's face is directed toward the SLP localizing a segment-1. This face orientation indicates to the system that segment-1 is the segment to be operated upon. In this example then, segment-1 is clarified and/or the other segments are made to sound less clear to the user.

Block 530 states convolve, during the telephone call, the one of the multiple different voices with a head related transfer function (HRTF) of the user.

Example embodiments are not limited to convolving the voice or sound with a HRTF since the voice can also be convolved or moved or adjusted with an HRIR, BRIR, ITD, ILD, or other transfer function or impulse response. Example embodiments can also execute or process a HRTF, BRTF, RTF or other transfer functions to deconvolve a voice or sound such as to remove from the voice or sound acoustic effects imprinted on the sound by a room or environment or a prior convolution. For example, a deconvolver can process a voice spoken in a certain room-1 together with a certain RTF-1 known for the room in order to remove or reduce the acoustic effects of the room-1 from the voice, or the voice can be processed with an inverted filter. The post-process voice can then be convolved with a different impulse response.

Block 540 states provide the telephone call to the user so the one of the multiple different voices externally localizes to the user while the other of the multiple different voices remains internally localized to the user.

Consider an example in which Alice, Bob, Charlie, and David are on a dial-in conference call with the parties being in various locations throughout the world. Alice participates in the call with her smartphone while she wears earphones. The voices of Bob, Charlie, and David are provided to her in mono sound. During the call, Alice issues an instruction to her smartphone to externally localize Bob's voice in front of her and three feet from her face. In response to this request, an audio diarization system segments, and identifies the voices. Bob's voice is extracted from the other voices and convolved with a left and right HRTF so his voice localizes to the sound localization point that Alice designated (i.e., in front of her and three feet from her face). The voices of Charlie and David continue to localize inside Alice's head while the voice of Bob now localizes externally to her.

Consider an example in which Alice and Bob are on a telephone call. Bob is in his apartment with loud music. Bob's voice and the music localize internally to Alice. During the telephone call Bob moves closer to the source of the music in his room, and the loudness of the music increases for Alice. Alice's audio system recognizes that the telephone call includes both Bob's voice and music. When the loudness of the music passes a threshold value, the audio system initiates automatic diarization of the telephone call. This process divides or separates the music from Bob's voice and then convolves the music so it externally localizes to Alice while Bob's voice continues to internally localize to Alice. Before the loudness of the music passes the threshold loudness value, both Bob's voice and the music internally localize to Alice. After the music passes the threshold loudness value, the music is moved to originate at a SLP that is remote from Alice. Alternatively, the audio system reduces the loudness of the music segment, or omits the music segment from the audio output to Alice so she does not hear the music Consider an example in which Alice and Bob are on a telephone call. Bob's voice internally localizes to Alice since his voice is provided to her in mono sound. Charlie and David then join the call so Alice talks to three different people (i.e., Bob, Charlie, and David). Alice's IPA (Hal) analyzes historic multi-party calls that include Alice and determines that Alice externally localizes voices 85% of the time for similar calling circumstances. Based on this predictive preference, Hal automatically moves the voices of Charlie and David so they externally localize to Alice. Hal leaves Bob's voice in mono sound to internally localize to Alice because her call history shows that she has not externally localized the voice of Bob in 86 of the 86 calls logged with Bob. Upon moving the voices, a voice of Hal states to Alice "moving voices, Charlie and David." Bob, Charlie, and David do not hear the voice of Hal and are unaware that the voices moved for Alice.

Consider an example in which Alice's mother and father phone her from their laptop that includes a single microphone, and Alice receives the call with her smartphone. Initially, Alice talks to her mother without the father. During this time, sound from the telephone call (the voice of her mother) localizes to Alice to a single SLP of (1.1 m, 20°, 0°). A voice recognition system detects one voice in the call. An audio diarization system does not segment the audio input since the telephone call has a single voice with no other sounds. Suddenly, Alice's father walks into the room where Alice's mother is and speaks to Alice through the laptop computer. A voice recognition system detects the addition of another voice, and Alice's smartphone activates the audio diarization system. The system segments the voices of the mother and the father and provides them to different SLPs. The voice of Alice's mother continues to localize to (1.1 m, 20°, 0°). Hal (Alice's IPA) knows Alice likes to hear the voice of her father at (1.1 m, −30°, 0°), so Hal selects this SLP for the voice of her father.

Figure 6:
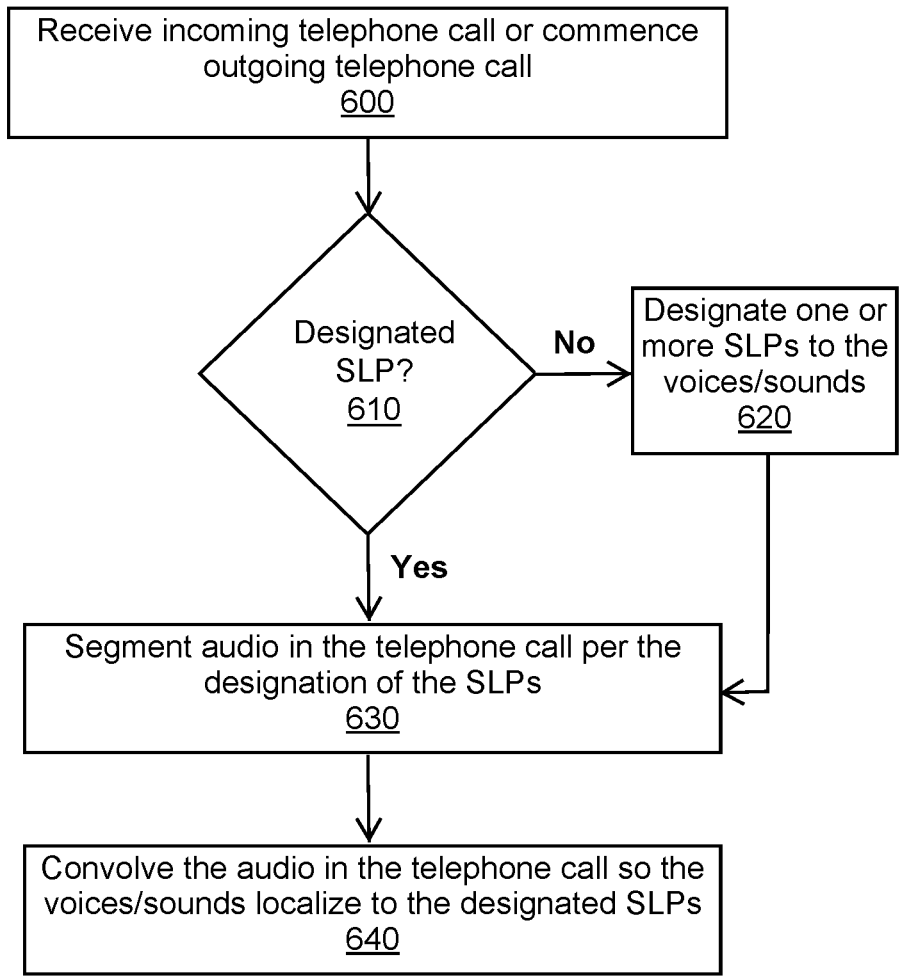
FIG. 6 is a method to designate a sound localization point (SLP) to a telephone call in accordance with an example embodiment.

FIG. 6 is a method to designate a sound localization point (SLP) to a telephone call in accordance with an example embodiment.

Block 600 states receive incoming telephone call or commence outgoing telephone call.

For example, a handheld portable electronic device (HPED) receives or commences a telephone call.

Block 610 makes a determination as to whether one or more SLPs are designated for the telephone call.

For example, a determination is made as to whether one or more SLPs are associated with the telephone call, such as a SLP being assigned to a telephone number being called, a SLP being assigned to a telephone number of a caller, a SLP being assigned to a party, contact, or person being called, or a SLP being assigned to a party, contact, telephone number, caller identification (caller ID) tag, or person calling (e.g., the calling person).

One or more SLPs can be associated with the telephone call in other ways as well. For example, a SLP is assigned to the telephone call based on a time of day, a day of the week, a global positioning system (GPS) location of a user (such as a calling party or receiving party), user preferences, present moment or historic or past assignments or considerations of SLPs for telephone calls or other sources, predictions of where a user wants to localize voices and/or sounds in the telephone call, etc.

If the answer to the determination in block 610 is "no" flow proceeds to block 620 that states designate one or more SLPs to the voices and/or sounds in the telephone calls.

Voices and/or sounds in a telephone call can have previous or predetermined SLP designations. For example, Alice designates in her user preferences that telephone calls with Bob execute so Bob's voice localized to a specific SLP. As another example, an audio diarization system is set to identify when a telephone call includes background music. When the background music is present, the audio diarization system segments the audio, separates the music from the speech, and outputs the music segment to an audio convolver, such as executed with a digital signal processor. The audio convolver convolves the music with a predetermined or preselected SLP so the listener localizes the music to an external location.

Designation of SLPs can also be based on a number of different speech or non-speech segments in the audio input. Consider an example rule for audio that provides as follows: Segment incoming audio input of a telephone call when the audio input has two or more different audio segments of voice. Per this rule, when audio input of a telephone call has a single speaker, then the voice of the speaker is not designated to an external SLP. When the audio input of a telephone call has two or more speakers, then the voices of the speakers are segmented and convolved to external SLPs.

If the answer to the determination in block 610 is "yes" flow proceeds to block 630 that states segment audio in the telephone call per the designation of the SLPs.

Block 640 states convolve the audio in the telephone call so the voices and/or sounds localize to the designated SLPs.

When a SLP is designated for a speech segment or non-speech segment, a SLP for the segment is retrieved. The speech segment or non-speech segment is convolved or otherwise processed so the speech segment or non-speech segment localizes to the SLP.

Consider an example in which Alice receives a telephone call on her smartphone from Bob who talks to Alice on a speakerphone in his car. Per Alice's user preferences, the voice of Bob localizes to Alice at (1.2 m, 20°, 0°). During the telephone call, a passenger (Charlie) in Bob's car, says "Hi Alice. It's me Charlie. How are you?" The sound localization system executing with Bob's car recognizes Charlie's voice and sends together with the audio an indicator that identifies Charlie as a second voice. When Charlie's speech arrives at Alice, her smartphone reads the indicator and retrieves Alice's preexisting SLP preference for Charlie as (1.2 m, −20°, 0°). A digital signal processor in her smartphone convolves Charlie's voice so it localizes to (1.2 m, −20°, 0°). At this time, Charlie and Bob both talk to Alice. An audio diarization system detects the two voices, segments the voices, and labels the segments of Charlie and Bob with unique indicators. The voices of Charlie and Bob continue to localize to the respective SLPs to Alice.

Predetermined or previously designated SLPs are stored in memory and are retrievable. For example, memory stores preferred SLPs or preferences for contacts and telephone numbers. For instance, when Bob calls Alice, her smartphone identifies the incoming party by telephone number, caller ID, Internet Protocol (IP) number, username, etc., consults the preferences associated with the identity, and retrieves a HRTF corresponding to a SLP preference.

SLPs and SLP designations can also be determined in real-time when needed or requested. For example, Alice receives a telephone call from an unknown party and an unknown voice of a caller. Her sound localization system (SLS) creates a SLP with coordinates (1.0 m, 0°, 90°) for unknown callers and designates the voice of this caller above her head at (1.0 m, 0°, 90°).

Figure 7:
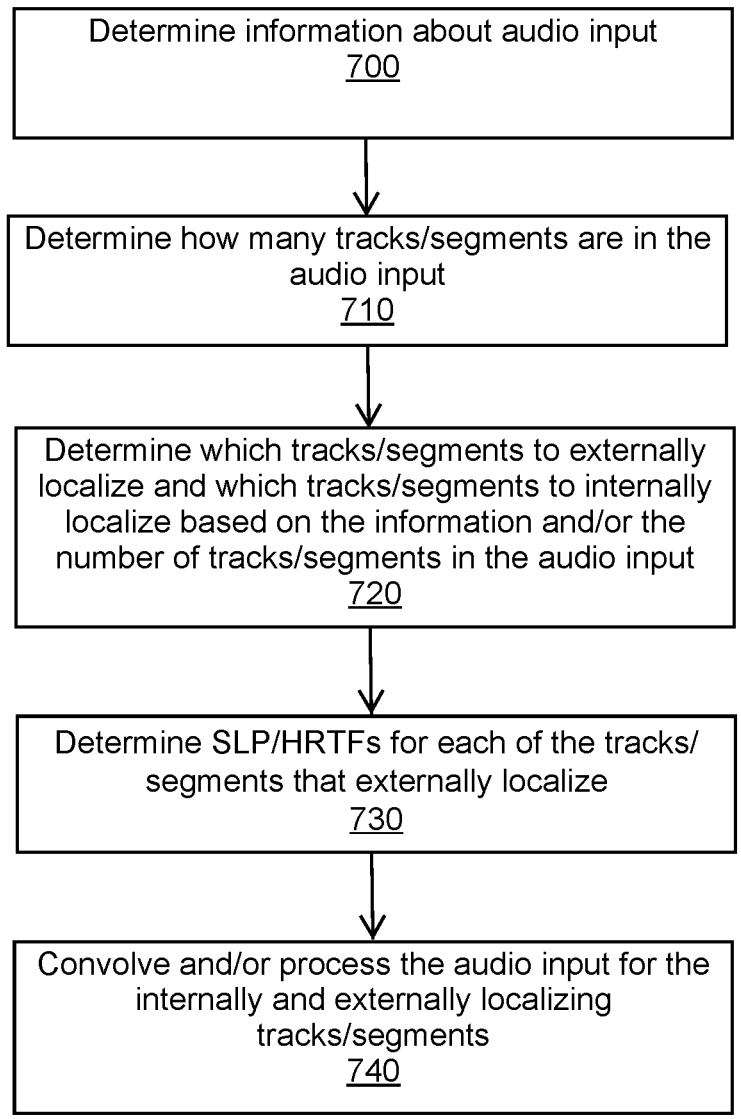
FIG. 7 is a method to convolve segments of an audio input in accordance with an example embodiment.

FIG. 7 is a method to convolve segments of an audio input in accordance with an example embodiment.

Block 700 states determine information about audio input.

The information includes, but is not limited to, one or more of a file format of the audio, a classification or type or source of the audio (e.g., a telephone call, a radio transmission, a television show, a game, a movie, audio output from a software application, etc.), monophonic, stereo, or binaural, a filename, a storage location, a universal resource locator (URL), a length or duration of the audio, a sampling rate, a bit resolution, a data rate, a compression scheme, an associated CODEC, a minimum, maximum, or average volume, amplitude, or loudness, a minimum, maximum, or average wavelength of the encoded sound, a date when the audio was recorded, updated, or last played, a GPS location of where the audio was recorded or captured, an owner of the audio, permissions attributed to the audio, a subject matter of the content of the audio, an identify of voices or sounds or speakers in the audio, music in the audio input, noise in the audio input, metadata about the audio, an IP address or International Mobile Subscriber Identity (IMSI) of the audio input, caller ID, an identity of the speech segment and/or non-speech segment (e.g., voice, music, noise, background noise, silence, computer generated sounds, IPA, IUA, natural sounds, a talking bot, etc.), and other information.

Block 710 states determine how many tracks/segments are in the audio input.

A number of tracks and/or segments in an audio input depend, for example, on the type, classification, designation, or definition of a track and/or segment. For example, a track and/or segment can be defined as speech or voice, music, speech with music, noise, gaming sounds, animal sounds, machine generated sounds, or other types of sound.

The number of tracks or segments can be based on the type of sound being processed or a type of sound that is relevant to a particular application. For example, an audio input can include five different types of sounds (e.g., three different speaker segments, one music segment, and one background noise segment). The system can be programmed or structured to manage localization for speaker segments, and hence the number of segments to localize to the user is three. Alternatively, the system can be programmed or structured to manage localization for speaker segments and music segments, and hence the number of segments to localize to the user is four.

In some instances, the number of tracks and/or segments in an audio input may not be known in advance of the diarization process. Alternatively, this number may be known (e.g., the number of segments in the audio input is provided with the audio input, such as being part of the metadata for the audio input). In other instances, the number of different or unique tracks and/or segments cannot be determined until after the diarization process. For example, the system is designated to segment speech and localize different voices to different SLPs, but the system does not know how many unique speakers are in the audio input until an end of the audio input. As yet another example, the audio input is stored after undergoing a diarization or voice/sound recognition process and subsequently transmitted or provided to an electronic device of a listener.

In an example embodiment, identified segments can be provided or not provided to an electronic device or a listener. For example, a diarization process outputs four segments. Two of these segments are sent to the user, and two of these segments are filtered and not sent. Tracks or channels can represent segments. For example, in an example embodiment, one stereo recording is presented to the user as two segments, one segment being the left stereo channel and one segment being the right stereo channel.

Consider an example in which the audio input includes information about the segments or sounds in the audio. For instance, this information is a data file that is a "map" of the segments included in the audio input (e.g., the map is a text file with a series of vectors for each of the segments, and the vectors include a start time-code and a run-length).

Block 720 states determine which tracks and/or segments to externally localize and which tracks and/or segments to internally localize based on the information and/or the number of tracks and/or segments in the audio input.

For example, an example embodiment determines one or more of which tracks and/or segments to internally localize to a user, which tracks and/or segments to externally localize to the user, which tracks to omit from localization processing, and which tracks to omit from output to the user. This determination can be based on the information about the audio input and/or the number of tracks and/or segments in the audio input.

Block 730 states determine SLP/HRTFs for each of the tracks/segments that externally localize.

Tracks and/or segments can be designated to localize internally or externally. Tracks and/or segments designated to internally localize are provided in monaural sound or stereo sound. Tracks and/or segments designated to externally localize are convolved or processed with a transfer function or impulse response, such as an HRTF, HRIR, BRIR, etc. The tracks and/or segments that internally localize can also be convolved or processed with a transfer function or impulse response, such as convolving a voice with a RIR while providing the voice to internally localize to the user.

Block 740 states convolve and/or process the audio input for the internally and externally localizing tracks/segments.

By way of example, a radio archive can include thousands or hundreds of thousands of audio recordings. A listener or computer program does not know in advance of segmentation how many speech segments or non-speech segments are in a particular radio archive. As such, it may be challenging for the user or computer program to determine a best or a preferred or an optimal localization for the sounds of the speech and non-speech segments at the time of playing. Additionally, the listener or computer program may not know information about the audio recordings pertinent to potential speech and non-speech SLPs. Example embodiments solve these problems and others.

Consider an example in which an archive audio recording has five different speakers but this number is unknown to a listener. An audio diarization system preprocesses the audio recording and determines that five different speakers or speech segments exist in the audio recording. This system determines the following information:
(1) Number of speakers: 4 speakers (Speaker 1-Speaker 4).
(2) Play duration of audio recording: 50 minutes.
(3) Identity of speakers: Winston Churchill (Speaker 2).
(4) Total minutes of speech excluding pauses and gaps: Speaker 1 (22 minutes), Speaker 2 (18 minutes), Speaker 3 (6 minutes), and Speaker 4 (4 minutes).

Based on this information, a sound localization system (SLS) makes informed designations or suggestions on localization for each of the four speakers. Since Winston Churchill is the single noted speaker in the audio recording and speaks for the second longest duration, the SLS place the voice of Winston Churchill (Speaker 2) near the listener at an optimal or prime location of (1.0 m, 20°, 0°). Since Speaker 1 has the largest amount of speaking time but is not known, the SLS places the voice of Speaker 1 near the listener at a second optimal location of (1.0 m, −20°, 0°). Speaker 3 talks for 6 minutes (a small amount of time relative to Speakers 1 and 2), so the SLS places the voice of Speaker 3 farther away from the listener at (1.8 m, 40°, 0°). Speaker 4 talks for 4 minutes (the least amount of time), so the SLS places the voice of Speaker 4 farther away from the listener at an opposite location of Speaker 3 of (1.8 m, −40°, 0°).

Consider an example in which a sound localization system (SLS) identifies speakers in a broadcast news show being received by the user with a TV-tuner software application, and places voices of each speaker at a different SLP relative to the listener. An audio diarization system segments and clusters the voices of the different speakers. The system places the audio in the segments at locations for the listener based on personal and/or the individual characteristics of the listener (e.g., his or her historic or previous placements such as common placements or recent placements, his or her user preferences, traits or personality of the listener, or another factor specific or unique to the listener). For example, multiple listeners of a particular broadcast or podcast (or an electronic device or software program of each listener) can individually determine where to localize each unique voice. For instance, each listener has a unique or customized listening experience since the selected SLPs (for the voices of the different speakers in the broadcast) are different for each listener. For example, listeners can localize the voices to favorite or preferred SLPs. Alternatively, these SLPs can be determined by an IUA acting on behalf of the listener.

Upon or following the SLP assignments for the segments, during or after the broadcast news show, the SLP or HRTF or BRIR assignments of each segment are saved, stored, or updated in the user preferences. The assignments are also stored or updated in the listener's contact list. For example, the news anchor Dharshini David whose voice is localized at a SLP-1, following the localization event, is added to the listener's contact list tagged with a name "Dharshini David" and with a default SLP specified as a SLP-1. The assignments are also stored as new records in the listener's call log or localization log with a timestamp, listener location, context, sound source, and other information about the localization event. At a later time, the listener plays a different episode of the news show that is not broadcast, but instead is streamed to the listener by on-demand podcast software. The podcast is segmented, and the voice of news anchor Dharshini David is identified by the system. The system consults the listener's user preferences, and/or contact list, and/or localization log, and looks for SLPs associated with Dharshini David. The SLS determines that a preferred and/or recent and/or common SLP for Dharshini David is SLP-1 and localizes the voice of Dharshini David to SLP-1. The listener experiences consistent localization of the voice of the news anchor from two different sources or software applications (TV-tuner and podcast player). Furthermore, the point of localization is not unexpected by the listener, but occurs at a familiar or recognizable location despite the difference in the communication channel, device, or software providing the audio. The news anchor is a "reappearing character" or sound, and the SLS can place the reappearing character at consistent localizations for a user without respect to a sound source. This process provides a user with a consistent listening experience.

Figure 8:
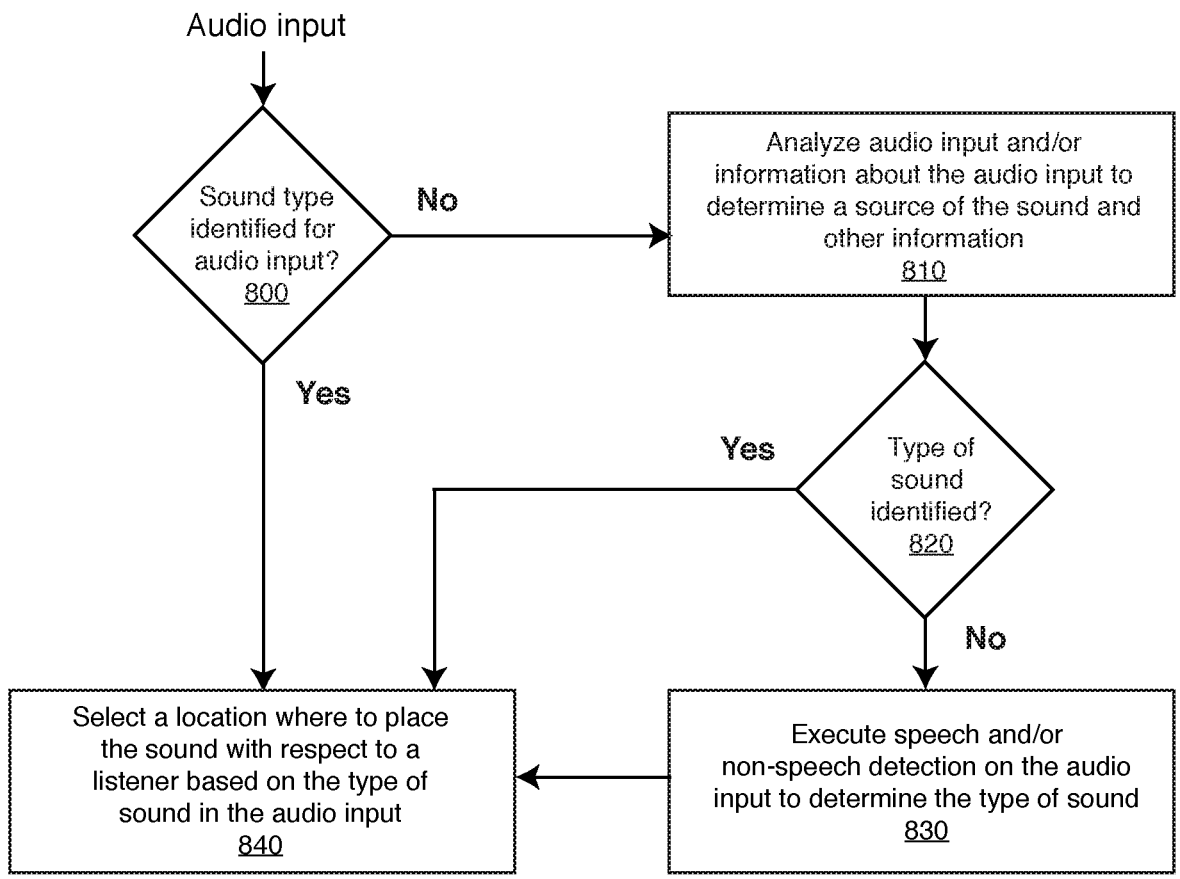
FIG. 8 is a method to select a location where to place sound in an audio input in accordance with an example embodiment.

FIG. 8 is a method to select a location where to place sound of an audio input in accordance with an example embodiment.

In an example embodiment, a computer system or electronic device analyzes or processes the audio input to determine a type of sound in the audio. For example, the audio input includes speech, non-speech, or a specific type of speech or non-speech, such as human voice, a particular human voice, computer generated voice, animal sounds, music or a particular music, type or genre of music (e.g., rock, jazz, classical, etc.), noise or background noise, etc.

In some example embodiments, sound analysis is not required for sound type identification because the sound is already identified, and the identification is accessible in order to consider in determining a localization for the sound. For example, the type of sound can be passed in an argument with the audio input, passed in header information with the audio input or audio source. The type of sound can also be determined by referencing information associated with the audio input designated. In some cases, further investigation of the sound input is executed in order to determine the type of sound in the sound input. The method of FIG. 8 can be used in multiple situations including, but not limited to, situations when a type of sound is not identified, when a type of sound is identified, and when some sounds are identified and others are not identified.

Block 800 receives an audio input and makes a determination as to whether the sound type is identified for the source of the sound.

For example, the audio input is supplied together with a designation of the sound type of the audio input, or the audio input file or stream includes a tag or a reference to the type of sound in the audio input. Alternatively, the type of sound may be previously known or identified, known when the sound is generated, known when the sound is received, known when the sound is obtained or retrieved, or known in another manner.

If the answer to this question is "yes" then flow proceeds to block 840 that states select a location where to place the sound with respect to a listener based on the type of sound in the audio input.

If the answer to this question is "no" then flow proceeds to block block 810 that states analyze audio input and/or information about the audio input to determine a source of the sound and other information.

Block 820 makes a determination as to whether the sound type has been identified for the source of the sound.

If the answer to this question is "yes" then flow proceeds to block 840 that states select a location where to place the sound with respect to a listener based on the type of sound in the audio input.

If the answer to the question in block 820 is "no" then flow proceeds to block 830 that states execute speech and/or non-speech detection on the audio input to determine the type of sound. Flow proceeds from block 830 to block 840.

The blocks in FIG. 8 can execute in different orders and still be within an example embodiment. In some example embodiments for example, block 830 can execute before block 810, after block 810 (as shown), or concurrently with block 810. Further, the type of sound can be determined, deduced, estimated, or predicted with block 810 alone, with block 830 alone, with a combination of blocks 810 and 830 (as shown), or with other factors discussed herein. As shown, the sound type can also be supplied and known without execution of 810 or 830.

Consider an example in which an operating system (OS) of an electronic device identifies a software application passing, transmitting, or processing sound to an output device, such as a network device, sound card, or headphones. The OS can determine a source of the sound based on the identification of the software application. A source of the sound can also be determined from one or more other indications including, but not limited to, a file type (for example as often indicated by a filename extension) of the audio input (e.g., "MP3" file), metadata or file header tags, file analysis (such as by investigating waveforms or using a DSP to examine other properties of the sound), content analysis (such as using Voice Activity Detection (VAD), voice recognition, Automatic Content Recognition (ACR), speech analytics (e.g., determining the language, words spoken in a voice sound, word meaning, a subject or topic of the content), the name of a speaker, the identity of a piece of music), a type of software providing the audio input (e.g., a media player, a game, a telephony application), a storage location (e.g., stored on a user's smartphone, local network, internet, cloud server), a duration of the audio input, a sender of the audio input, an electronic device or computer program transmitting or providing the sound, header or packet information, or an associated CODEC.

Audio can have many different sources. Examples of some of these sources include, but are not limited to, sound sources shown in example embodiments, a telephone or HPED that makes telephone calls, a computer program (e.g., an IPA or IUA), the internet (e.g., YOUTUBE or other media streaming service), another person or physical environment (e.g., a person that captures binaural sound with two microphones and shares this sound), an electronic device (e.g., a server or a HPED), a music library or music player, a video player, a software application (e.g., a virtual reality (VR) game), memory (e.g., a flash memory device, a CD, a DVD, a solid state drive, a hard drive, etc.), a TV or radio emission or broadcast, a wireless transmission, an appliance, a car, a public kiosk, a security system, a medical device, a home entertainment system, a public entertainment system, and a virtual sound source, such as a speaker in a virtual reality (VR) space or as an augmented reality (AR) fixture.

In an example embodiment, a computer system or electronic device analyzes the audio input and/or information about the audio input to determine a source of the sound. For example, the sound is included as an attachment to an email, and the sender or contents of the email reveals a source of the sound. As another example, the source is determined from a URL or other data pointer to the sound (e.g., a link of a proprietary format to stored sound such as radio programs, video program archives, movies, or podcasts). As another example, metadata about or with the audio input provides information about the source or origin of the sound. As yet another example, the computer program generating the sound provides information about the source of the sound by referencing tags or header information provided by the OS (e.g., sound from a "bot" or software robot, a natural language user interface, or an intelligent personal assistant provides information about the source and that the sound is likely voice or speech).

Information about the source of the audio input can be sufficient to identify a type of sound in the audio input. For example, if the source of the audio input is a telephone call from Bob to Alice, then Alice's smartphone can ascertain with sufficient certainty that the telephone call is speech and likely the voice of Bob since her smartphone recognizes his telephone number.

In other instances, information about the source of the audio input can be analyzed to predict with a reasonable likelihood the type of sound in the audio input. By way of example, this information includes, but is not limited to, a type of file or format of the audio input, a location where the sound is stored, a filename extension of the audio input (e.g., WAV or MP3), an electronic device transmitting the sound, and other information discussed herein.

Consider an example in which Alice receives on her smartphone a text message from her cellular service provider. The text message notifies her that she has a new voicemail message and includes a link to activate to hear the message. When Alice activates the link, her smartphone knows the source of the sound is a voicemail message. For example, the smartphone recognizes the link name, link format, or link target, or recognizes the telephone number to retrieve the message. Her smartphone retrieves a left and a right HRTF associated with voicemail messages and convolves the message sound with the HRTFs so the message sound externally localizes to a SLP that Alice usually uses for voicemails. Alice is familiar with the location of sound specified by the SLP and expects the voicemail message sound at the location since the location is where she prefers to hear her voicemail messages.

Consider another example in which the type of sound can be determined from a source of the sound. For instance, sounds originating from a database of 1940's radio news broadcasts can be typed as speech by default since news broadcasts were given by a voice of a broadcast reporter or anchor. Likewise, an audio file titled "NBC Symphony Orchestra: Beethoven's Fifth Symphony" may be categorized by default as music based on the title of the audio file.

In other instances, the type of sound can be determined or inferred from other information, such as a type of file, file format, title of the file, CODEC associated with the file, compression or storage method, metadata or headers, and other information. The type of sound can also be determined from sampling portions of the audio input, processing the audio input, or executing audio diarization on the audio input. For example, a DSP analyses forty random 50 ms slices of a sound file with distribution of the slices weighted toward the front, middle, and end of the file. The DSP determines that the file includes both music and voice.

The source of the audio input may or may not be sufficient to determine the type of sound in the audio input. For example, the source of the audio input and other information can provide sufficient information to know the type of sound with certainty (e.g., 95%-100%), with a high degree of certainty (e.g., 85%-94%), with a reasonable degree of certainty (e.g., 70%-84%), or more likely than not (e.g., 51% or more).

By way of example, a speech/non-speech detector executes to determine if a segment of the audio input is speech and/or non-speech. Examples of speech/non-speech detectors include, but are not limited to, hardware and software that execute Gaussian Mixture Models (GMM), Support Vector Machines (SVM), Neural Networks (NN), Voice Activity Detectors (VAD), and other models discussed herein.

In an example embodiment, an electronic device, computer program, or user selects a location where to place the sound with respect to a listener based on the type of sound in the audio segment being speech and/or non-speech. A location where to localize the sound for the listener can depend on the type of sound being provided to the listener. A user or an electronic device can designate certain sounds to localize to certain areas or certain SLPs. For example, a user designates music to localize to one set of SLPs, voices in radio and television to localize to another set of SLPs, voices in telephone calls to localize to another set of SLPs, sound in movies to localize to another set of SLPs, etc.

The localization point of the sound for the user can depend on one or more other factors, such as an identification or identity of a sound (e.g., an identity of a voice as belonging to Alice), a duration or length of the sound, a meaning of the sound (e.g., localize warnings and alerts to a certain area or a certain SLP), a purpose or classification of the sound (e.g., localize advertisements to a predetermined, user-selected SLP), or other factors discussed herein.

Consider an example in which similar types of sound are placed in SLPs external to or internal to the user. For example, a user listens to a radio show that localizes to a SLP at (1.0 m, 25°, 45°). During the radio show, an advertisement plays to a user at this SLP. The user does not want to hear the advertisement at this SLP and moves the sound to a SLP at (5.0 m, 20°, 0°) with a reduced volume. The user's manual re-designation of the SLP is a weighted indication to the SLS of a preference of the user to hear advertisements at (5.0 m, 20°, 0°). In response to this determination, the SLS updates the user preferences accordingly. Later, an advertisement is played during the radio show. The user's sound localization system recognizes the sound as an advertisement, consults the user's preferences, and automatically moves the sound of this advertisement to (5.0 m, 20°, 0°) with a reduced volume.

In some example embodiments, the audio input can be localized and/or SLPs selected without consideration of and/or knowledge of the source of the sound. Consider an example in which Alice's HPED detects when earphones are plugged into the HPED or when the HPED is wirelessly communicating with the earphones. When this event occurs, sound provided to the earphones is automatically processed or segmented for speech and/or non-speech. Speech is convolved or processed to localize to one area, and non-speech is convolved or processed to localize to another area.

Consider an example in which Bob is driving, and his children are sleeping in back seat. He designates that while he is in the car sounds localize to (0.2 m, 40°)–43°. This SLP represents the position of his car radio in the dashboard relative to his face. The system receives an incoming sound, consults Bob's designations with the knowledge that Bob's current context is in a car, and convolves the sound to (0.2 m, 40°)–43° without regard to the sound source according to Bob's designation. Bob then hears the sound originate from his dashboard. As a result, Bob knows that sounds he hears localized from other locations are his children stirring or another sound from the environment.

As another example, a SLP selector is unable to determine the source of a input sound and assigns a SLP recently selected by the user for another sound, or assigns a SLP designated as a default SLP for sounds from sources that cannot be identified. As another example, the SLP selector is passed a pointer to an audio source and a segment ID. When the SLP selector queries the system using the supplied segment ID in order to learn about the sound in the audio source, the data returned is null, unintelligible, improperly formatted, or an error code. The SLP selector proceeds with assigning a SLP for the audio source and selects a SLP pre-designated by the user for sounds without fully qualified information. As another example, a user commands a current SLP at (1 m, 20°) 0° to "copy sound to left side" while continuing to localize active sound sources assigned to the SLP. The command triggers the SLP selector to copy the instance of the current SLP (including the designations of each source that localizes to this SLP) to (1 m, −20°, 0°). The user localizes two SLPS. The copy operation executes without the need to query, read, or refer to sound source(s).

Figure 9:
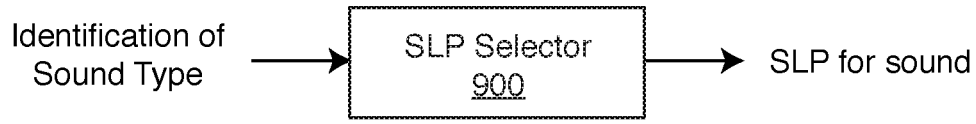
FIG. 9 is a sound localization point (SLP) selector that determines where to localize sounds in accordance with an example embodiment.

FIG. 9 shows a sound localization point (SLP) selector 900 that determines where to localize sounds in accordance with an example embodiment. The SLP selector receives as input an identification of a sound or type of sound, or sound source. The SLP selector determines, based on the sound, type and/or source, and/or other information, one or more sound localization points (SLPs), HRTFs, BRTFs, RTFs, or other impulse responses to apply to the sound (e.g., for convolution/deconvolution of the sound).

The SLP selector can select a general area or location for the sound (e.g., place the sound so it externally localizes to a right side of a person) or a specific location (e.g., place the sound so it externally localizes to a specific SLP or with a specific pair of left and right HRTFs).

When a SLP is selected, then a corresponding HRTF for the selected SLP is retrieved. If a SLP does not have a HRTF, then one can be computed, calculated or captured for the SLP (such as interpolating a HRTF between two or more known neighboring HRTFs in order to correlate a HRTF for the selected SLP).

A person or a user can select one or more SLPs that provide a location where sound will localize to the person. As one example, the person selects a location for where to externally localize sound through interaction with a UI or a display of an electronic device, such as a smartphone, a head mounted display, or an optical head mounted display. As another example, a computer program or process, such as an intelligent user agent or an intelligent personal assistant, selects one or more SLPs where sound will localize to the person.

Consider an example in which Alice receives a telephone call from an unknown telephone number on her smartphone. The smartphone identifies the incoming audio input as a telephone call, and the SLP selector provides the call to Alice in monaural sound so it internally localizes to her. This decision to internally localize the sound is based on one or more of Alice's user preferences, and SLPs for previous telephone calls from unknown numbers to Alice. When Alice answers the call, sounds from the call internally localize to her. Bob then speaks as the caller, and the sound localization system (SLS) recognizes Bob's voice. The SLS automatically retrieves HRTFs for a SLP that Alice has selected to localize the voice of Bob in a prior call. The SLS then moves Bob's voice to localize in front of Alice's face since she prefers to hear his voice from this location.

Consider an example embodiment in which the SLP selector is included with a digital signal processor (DSP) that is located in a handheld portable electronic device (HPED), such as a smartphone. The SLP selector is provided with or identifies a type of sound of a sound segment. Based on this information, the SLP selector assigns a HRTF for the sound or sound segment.

In an example embodiment, the SLP selector, or SLP selector functions, execute by or with a DSP or other integrated circuit. The SLP selector or SLP selector functions can also be executed using another type of chip, such as a field-programmable gate array (FPGA), microprocessor, microcontroller, or other type of architecture or central processing unit (CPU), such as a Reduced Instruction Set Computing (RISC) processor.

Audio input information and related SLP, device, and user information can be retrieved, stored, analyzed, transmitted, and processed to assist in executing an example embodiment.

FIG. 10A shows a table 1000A of example historic audio information that can be stored by the system for a user in accordance with an example embodiment.

The audio information in table 1000A includes sound sources, sound types, and other information about sounds that were localized to the user with one or more electronic devices (e.g., sound localized to a user with a smartphone, HPED, or other electronic device). The column labeled Sound Source provides information about the source of the audio input (e.g., telephone call, internet, smartphone program, cloud memory (movies folder), satellite radio, or others shown in example embodiments). The column labeled Sound Type provides information on what type of sound was in the segment (e.g., speech, music, both, and others). The column labeled ID provides information about the character of the audio input (e.g., Bob (human), advertisement, Hal (IPA), an acoustic fingerprint of the audio input, or others as discussed in example embodiments). The column labeled SLP provides information on where the sounds were localized to the user. Each SLP (e.g., SLP2) has a different localization point for the user. The column labeled Transfer Function or Impulse Response provides the transfer function or impulse response processed to convolve the sound. The column can also provide a reference or pointer to a record in another table that includes the transfer function or impulse response, and other information. The column labeled Date provides the timestamp that the user listened to the audio input (shown as a date for simplicity). The column labeled Duration provides the duration of time that the audio input was played to the user.

The system can store other historic information about audio, such as the location of the user at the time of the sound, his position and orientation at the time of the sound, and other information. The system can store one or more contexts of the user at the time of the sound (e.g., driving, sleeping, in a VR environment, etc.). The system can store detailed information about the event that stopped the sound (e.g., end-of-file was reached, connection was interrupted, another sound was given priority, termination was requested, etc.). If termination is due to the prioritization of another sound, the identity and other information about the prioritized sound can be stored. If termination was due to a request, information about the request can be stored, such as the identity of the user, application, device, or process that requested the termination.

As one example, the second row of the table 1000A shows that on Jan. 1, 2016 (Date: Jan. 1, 2016) the user was on a telephone call (Sound Source: Telephone call) that included speech (Sound Type: Speech) with a person identified as Bob (Identification: Bob (human)) for 53 seconds (Duration 53 seconds). During this telephone call, the voice of Bob localized with a HRIR (Transfer Function or Impulse Response: HRIR) of the user to SLP2 (SLP: SLP2).

FIG. 10B shows a table 1000B of example user preferences of a user for localizing a sound source of telephone calls in accordance with an example embodiment.

Table 1000B includes user preferences for sound types of speech and non-speech for telephone calls. By way of example and as shown in the table, both speech and non-speech for a sound source of a specific telephone number (+852 6343 0155) localize to SLP1 (1.0 m, 10°, 10°). When a person calls the user from this telephone number, sound in the telephone call localizes to SLP1.

As shown in the table, telephone calls from or to Bob or telephone calls with Bob are divided into two sound types. The voice of Bob localizes to SLP2. If the call includes music, then the music localizes to one of three assigned SLPs (SLP3-SLP5).

This table further shows that sounds from telephone calls from or to Charlie or telephone calls with Charlie internally localize to the user (shown as SLP6). Teleconference calls or multi-party calls localize to SLP20-SLP23. Each speaker identified in the call is assigned a different SLP (shown by way of example of assigning unique SLPs for up to four different speakers, though more SLPs can be added). Calls to or from unknown parties or unknown numbers localize internally and in mono.

Other preference information about telephone calls can be stored or shown as columns, such as the location of the user at the time of the call, the device and/or application executing or processing the call by the caller and user, one or more contexts of the user and caller at the time of the call (e.g. driving, in a meeting, in a VR environment), caller or segment prioritization, and other information.

FIG. 10C shows a table 1000C of example user preferences of a user for localizing miscellaneous sound sources in accordance with an example embodiment.

As shown in table 1000C, audio files or audio input from BBC archives localizes to different SLPs. Speech in the segmented audio localizes to SLP30-SLP35. Music segments (if included) localize to SLP40, and other sounds localize internally to the user.

As further shown in the table, YOUTUBE music videos localize to SLP45 for the user, and advertisements (speech and non-speech) localize internally. External localization of advertisements is blocked. For example, if an advertisement requests to play to the user at a SLP with external coordinates, the request is denied. The advertisement instead plays internally to the user, is muted, or not played. Sounds from appliances are divided into different SLPs for speech, non-speech (warnings and alerts), and non-speech (other). For example, a voice message from an appliance localizes to SLP50 to the user, while a warning or alert (such as an alert from an oven indicating a cooking timer event) localizes to SLP51. The table further shows that the user's intelligent personal assistant (named Hal) localizes to SLP60.

The information stored in the tables and other information discussed herein can assist a user, an electronic device, and/or a computer program in making informed decisions on how to process sound (e.g., where to localize the sound, what transfer functions or impulse responses to provide to convolve the sounds, what volume to provide a sound, what priority to give a sound, when to give a sound exclusive priority, muting or pausing other sounds, such as during an emergency or urgent sound alert, or other decisions, such as executing one or more elements in methods discussed herein). Further, information in the tables is illustrative, and the tables can include different or other information fields, such as audio input or audio information discussed herein.

Decisions on where to place sound can be based on one or more factors, such as historic localization information from a database, user preferences from a database, the type of sound, the source of the sound, the duration of the sound, a size of space around the user, a position and orientation of a user within or with respect to the space, a location of user, a context of a user (such as driving a car, on public transportation, in a meeting, in a visually rendered space such as wearing VR goggles), historic information or previous SLPs (e.g., information shown in table 1000), preferences of the listener, preferences of other users, industry standards, consistency of a user sound space, and other information discussed herein.

Consider an example in which each user has a unique set of rules or preferences for where to localize different types of sound. When it is time to play a sound segment to the user, the user's system knows the type of sound (e.g., speech, music, chimes, advertisement, etc.) and checks the user's preferences and/or historic data in order to determine where to localize the sound segment for the user. This location for one user can differ for another user. For example, Alice prefers to hear music localize inside her head, but Bob prefers to hear music externally localize at an azimuth position of +15°. Alice and Bob in identical contexts and locations and presented with matching media player software playing matching concurrent audio streams can have different SLPs designated for the sound by their SLP selectors. For instance, Bob's preferences indicate localizing sounds to a right side of his head, whereas Alice's preferences indicate localizing these sounds to a left side of her head. Although Alice and Bob localize the sound differently, they both get consistent personal user experiences since music localizes to their individually preferred SLPs.

FIG. 11 is a method to localize different types of sounds to users in accordance with an example embodiment.

Block 1100 states provide a user with different types of sound.

Different types of sound can be provided to the user at one or more particular times (e.g., provided to the user in response to OS commands or events, by one or more software applications executing on a HPED, and/or one or more input sources coupled to headphones, smart earphones, or OHMD worn by the user) or provided to the user over a period of time. Further, the sounds can be provided to the user from other users (e.g., Alice telephones Bob) or provided to the user from various sources (e.g., a user hears an advertisement upon clicking on a URL; or a user hears sounds from his physical environment, such as sounds captured by one or more microphones worn by the user or sounds in the physical environment).

As one example, a software program executes, provides the user with different types of sounds, and asks the user to decide where he or she desires to localize this type of sound. These sounds can be provided by name (e.g., asking the user where he wants to localize music). Alternatively, these sounds can be provided through listening (e.g., play music to the listener and ask where she wants to localize the music).

As another example, the different types of sounds are provided to the user during a natural or ordinary course of the day for the user. Over a course of a period of time (e.g., hours, days, weeks, etc.), a user will hear different sounds, and these sounds will localize to different points or areas. For example, the user receives a telephone call and localizes the voices to one SLP, listens to music on his smartphone and localizes this music to another SLP, etc.

Block 1110 states determine where the user desires to localize the different types of sound and/or where the different types of sound actually have localized to the user.

The user can directly or indirectly provide a location for a type of sound. For example, a user interacts with a software program and instructs this program to localize the voice of Alice to SLP (1.0 m, 15°, 0°). As another example, SLPs are provided in his or her user preferences. As another example, a user moves a sound, and this movement signifies the user's desire to have such types of sounds localized in the future to the point or area to where the sound was moved. For instance, Alice interacts with her smartphone and moves a voice of her intelligent personal assistant (Hal) to a location above her head. This act of moving the voice of Hal can indicate Alice's desire to have Hal localize at this SLP in the future. As yet another example, a user presented with a localized type of sound takes no action with regard to where the type of sound localizes. This lack of action signifies the user's desire or acceptance of the location that can therefore be stored as a default location.

Block 1120 states store the locations where the different types of sounds localize to the user.

These locations along with the associated transfer functions or impulse responses (e.g., HRTFs, HRIRs, BRIRs, etc.) can be stored in memory, such as in the form of a database in the memory of a handheld portable electronic device (HPED), memory in a server, or memory in another location.

Block 1130 states process the locations of where the different types of sounds localized to the user to provide the user with consistent or similar sound localization experiences.

A user experiences consistent localization experiences when same or similar types of sounds localize in a way that is not unexpected by the user. A user experiences similar localization experiences when same or similar types of sounds localize in a similar way.

Consider an example in which Alice prefers to hear rock music externally localize close to her head (e.g., around one meter) but prefers to hear classical music internally localize in her head (e.g., in stereo sound). Each time she engages her music player software application to play music files stored on her HPED or plays a music stream from another software application such as a web browser, the music is convolved so the rock music plays to her preferred external location and classical music plays to her preferred internal location. By taking into account the type of music or sound, Alice experiences consistent localization across input sources rather than according to input source.

In some instances, sound type alone may not be sufficient or reliable to prevent localizations that are unexpected to the user. Consider an example where the input source is a movie called "My Dinner with Andre" in which Andre and Wally have a conversation at a table. The audio diarization system segments the soundtrack of the film into a segment for the voice of Andre and a segment for the voice of Wally. While Alice watches the movie, the segment of each voice is dynamically localized according to the weight of the voice in the stereo pan of the stereo soundtrack. Andre sits at the table on the left side of the video frame while Wally sits across from Andre toward the right side of the frame. Andre's voice is much louder in the left channel than the right channel, and Alice hears the voice of Andre localized to her left and the voice of Wally localized to her right. Suddenly in mid-sentence, the camera angle changes to Wally's point-of-view and Alice sees a frontal shot of Andre centered in the frame. Simultaneously, the segment of the voice of Andre changes to a near 0° azimuth to Alice, and the voice of Wally suddenly becomes internalized to Alice. These are drastic and different SLP movements but they are not unexpected to Alice and in fact provide her with a consistent user experience.

Consider another example in which Alice receives a phone call from two unknown callers. The voices are segmented and localized with a default angular difference of 30° azimuth. Later she receives a call from two friends at a restaurant. The voices of the friends are segmented and localized to the default SLPs designated to them respectively by Alice for one-on-one calls. Although the two friends are being localized simultaneously and separated by an angle of 15° (half of a default separation), the voice localizations are not unexpected by Alice, and she does not adjust them.

Consider an example in which Alice plays a game with a single diarized segment. The segment is music localized to a SLP-1. When she achieves a high score, an unknown human voice from the game application exclaims, "High score! Nice job!" The diarization system creates a new segment of voice type for the human voice of the game, and the SLP selector designates the same SLP-1 for the new voice segment. Alice expects unknown human voices from her primary telephony application at a certain SLP-2. The game voice is indeed typed as an unknown human voice, but a localization of the game voice at SLP-2 would be unexpected to Alice. The SLP selector considers both the sound type and source of the game voice (the game software application) and determines that a designation of SLP-1 would provide Alice with a more consistent user experience than a designation of SLP-2. Consequently, the location of the sudden human voice at SLP-1 is not unexpected by Alice.

In these examples, the sound types are voices, but in other circumstances a determination of a sound type alone (such as a determination that the sound is a voice) is not sufficient information from which to derive a localization that will prevent the user from experiencing a localization that is unexpected. Both the sound type and the sound source can be considered together in an example embodiment.

Example embodiments can provide a user with consistent and appropriate localizations and a consistent audio experience that minimizes events that are unexpected or unwanted by the user. For example, a sound event may be unwanted by a user due to a time of day, his location, his activity, or his situation or context. In order to provide this consistency, the SLP selector makes decisions for the user, such as where to localize sound. The SLP selector can also make other decisions with regard to binaural sound, such as loudness, timing (e.g., when to localize the sound), or whether to permit or to deny a sound that has been requested to play. The SLP selector can also consider which application, device, user, IPA, etc. requested the sound to play. In one example embodiment, the SLP selector, IUA, IPA, or other program makes a determination about these aspects of the sound based on information included in memory, such as information stored in a localization log or user preferences.

Consider an example in which a SLP selector determines that a default SLP for unknown callers as specified or provided by a telephony application is a SLP-1. The SLP selector designates SLP-1 for the localization of the voice of four consecutive calls, and the user changes the localization or volume of each call. The system determines that SLP-1 or the volume level is not considered appropriate by the user and discontinues using SLP-1 or the volume level as a default for unknown voices.

As another example, the sound localization system (SLS) localizes voicemail messages to a user as they arrive. Between 9:00 A.M. and 11:20 A.M., the user commonly interrupts or cancels the playing of the message. The system notices these interruptions as a statistic of the localization history and prevents voicemails from playing that request localization between 9:00 A.M. and 11:20 A.M. In this example, a time of day or timing bears on providing a user with an audio experience that is consistent, expected, or appropriate.

Figure 12:
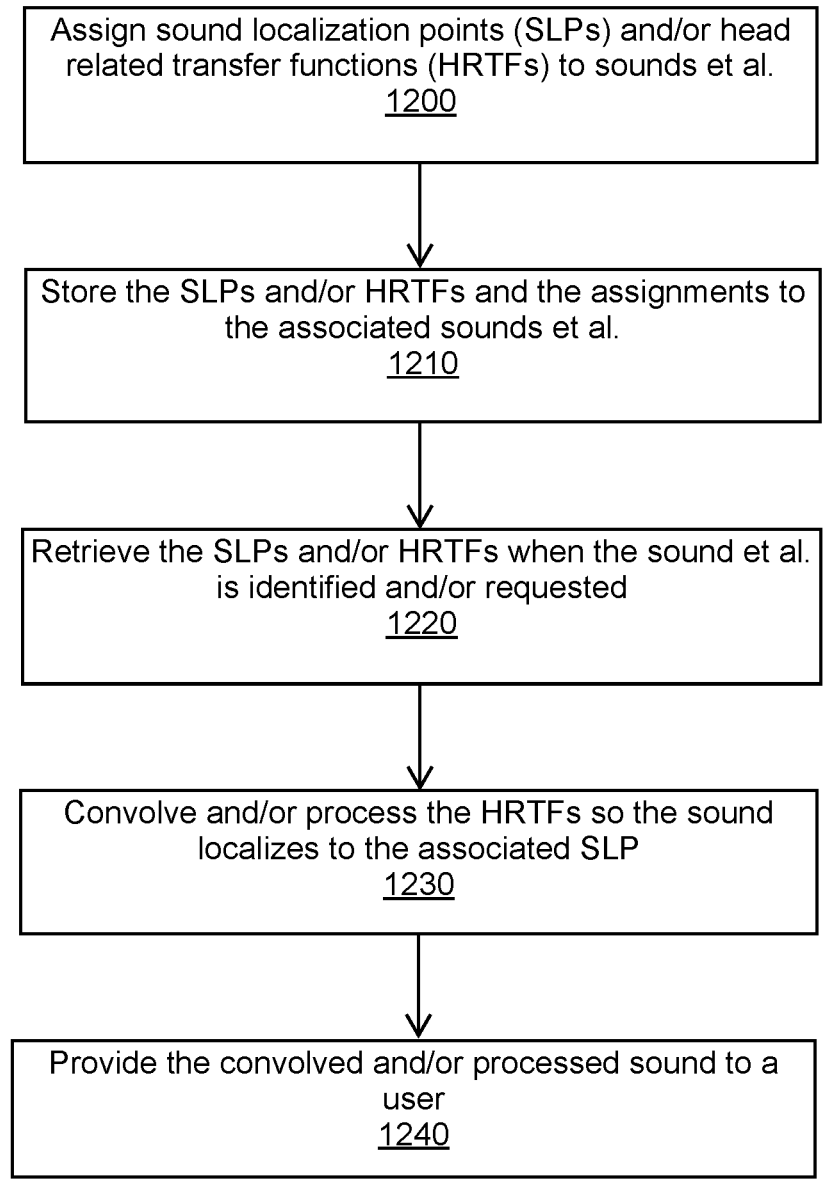
FIG. 12 is a method to assign head related transfer functions (HRTFs) to sounds in accordance with an example embodiment.

FIG. 12 is a method to assign head related transfer functions (HRTFs) to sounds in accordance with an example embodiment.

Block 1200 states assign sound localization points (SLPs) and/or head related transfer functions (HRTFs) to sounds et al.

An electronic device, user, and/or software program or process can assign or designate associations between one or more SLPs, HRTFs, HRIRs, BRIRs, RIRs, etc. and one or more sounds et al. By way of example, these sounds et al. include, but are not limited to, people, names (e.g., names in a contact file, address book, contact list, personnel database, telephone or email contact list), unique voices (e.g., voices in a radio broadcast or a voice of a friend), voice samples, voiceprints, acoustic fingerprints, voice or sound signatures, an intelligent personal assistant (IPA) or intelligent user agent (IUA), gender (e.g., SLPs/HRTFs assigned to males and SLPs/HRTFs assigned to females), phone numbers, geographical locations, electronic devices, computer programs, games, music, streams, files, different segments in a diarized voice exchange, different segment sound types, different devices such as devices on a network, different applications or virtual devices, different appliances, or other types of sound and devices.

Consider an example in which a user or a voice recognition system assigns SLPs/HRTFs to friends in his telephone directory. As another example, a computer program assigns SLPs/HRTFs to different sounds in a VR game. As another example, an IPA designates SLPs/HRTFs to different types or categories of music.

Block 1210 states store the SLPs and/or HRTFs and the assignments to the associated sounds et al.

This information can be stored in memory, such as memory in a HPED, a server, or a database. The information can also be stored as user preferences (e.g., stored as a preference, a priority, something that is preferred).

Block 1220 states retrieve the SLPs and/or HRTFs when the sound et al. is identified and/or requested.

An electronic device or software program retrieves or obtains the SLPs/HRTFs from memory when they are desired or requested. For example, a SLP selector retrieves one or more SLPs/HRTFs and provides them to a DSP to convolve sound for a user. As another example, the SLPs/HRTFs are pre-fetched, stored in cache, and obtained by a DSP for convolving and/or processing binaural sounds to a listener. As another example, a voice of a person is identified during a telephone call, and HRTFs associated with the person are retrieved so the voice of the person localizes per user preferences of the listener.

Block 1230 states convolve with and/or process the HRTFs so the sound localizes to the associated SLP.

For example, a processor or DSP executes a convolving process with the retrieved HRTFs (or other transfer functions or impulse responses) to process sound so that the sound is adjusted. For example, the DSP converts mono or stereo sound to binaural sound so this binaural sound externally localizes to the user.

Block 1240 states provide the convolved and/or processed sound to a user.

For example, an electronic device or software program provides the convolved and/or processed sound to the user so the user can localize the sound and hear it. The user can experience a resulting localization externally (such as at a SLP associated with near field HRTFs and far field HRTFs) or internally (such as monaural sound or stereo sound).

Sounds can be provided to the user through speakers, such as headphones, earphones, stereo speakers, etc. The sound can also be transmitted, stored, further processed, and provided to another user, electronic device or to a software program or process.

Consider an example in which a user desires to have male voices convolve to one or more locations having a positive azimuth location along an azimuth plane located in front of the user. He desires to have female voices convolve to one or more locations having a negative azimuth location. The SLPs for voices are based on or associated with a gender of the speaker or a gender or calculated gender of the voice. For example, the user receives a telephone call from an unknown caller. When the caller speaks, the user's smartphone recognizes or identifies the voice as being female and automatically chooses a HRTF of the user so the female voice convolves to a negative azimuth location (e.g., −10°, −20°, −30°, or −40° on the horizontal plane).

Consider an example in which a technology, entertainment, or education company sells, rents or provides HRTFs, BRIRs, or RIRs, such as a set of one or more HRTF pairs to users. Some of these HRTFs include an optimization, preference, or designation for certain types of sounds (e.g., some HRTFs designated for music, some HRTFs designated for speech in telephone calls, some HRTFs designated for voices in games, some HRTFs designated for IPAs, some HRTFs designated for warnings from appliances, some BRIRs designated for listening in cars, etc.). For example, a music publisher rents availability of RIRs matching the impulse responses of a near center stage position inside a famous music venue called CBGBs. The music publisher assigns the RIRs to musical group Talking Heads. When the user plays a song by Talking Heads, the song is convolved with the assigned RIRs. The user hears the sound of the song as though the user were near the stage in CBGBs where Talking Heads commonly performed concerts.

HRIRs/HRTFs, BRIRs/BRTFs, RIRs/RTFs, etc. can be assigned to a place or location, and can be employed in both convolution and deconvolution. For example, NASA publishes RTFs of a cockpit position in a space shuttle, and Bob assigns the RTFs to the record of his boss in his phone's address book and to the voice of his coworker Alice. Bob also has RTFs for the position at his desk at the office created by transforming RIRs that he captured at his desk from a friend sitting in a particular blue chair a meter away from the desk. When the RTFs were created from the RIRs captured at the desk, they were assigned a tag indicating the location of the impulse capture. When Bob is at his desk at the office he listens to his coworker Alice who sits in the blue chair. Bob is wearing earphones including binaural microphones providing mic-thru sound that can be processed by the SLS in his phone. He designates his phone to localize the mic-thru sound source. His phone recognizes the voice of Alice in the live mic-thru segment and executes a program to retrieve RTFs associated with her voice. The program retrieves the RTFs of the shuttle cockpit assigned to her voice. Before convolving a sound with RTFs, the phone executes a routine to determine if it is possible to remove RIRs or clean/dry the source. In this case the phone determines that the RTFs for the current location (Bob's office) have been stored and are retrievable. In response to this determination, the phone retrieves the RTFs tagged with the position of Bob's desk and submits the RTFs as input to deconvolve the voice of Alice from the mic-thru sound. The voice of Alice with diminished room characteristics is convolved with the space shuttle RTFs as designated. Bob hears Alice speaking in the blue chair as though they are in a space shuttle together. Later Bob's boss calls Bob, the phone retrieves the space shuttle RTFs and a HRTF (proximate to Bob) designated to the address book record of Bob's boss. Bob hears his boss proximate to him, and Alice in the blue chair, as though the three of them are in a space shuttle.

Consider an example in which an IPA (named Hal) monitors locations where his user (Alice) localizes different types of sounds. Over a period of time, Hal observes that Alice prefers to localize music internally, localize voices in telephone calls to azimuth positions+20° and −20°, localize advertisements to far field HRTFs beyond three meters, and localize voice messages above her head. Hal updates Alice's sound user preferences to indicate her preferences for where to localize binaural sounds. Later, for example, when Alice receives a voice message, this message automatically localizes above her head per her sound user preferences.

Figure 13:
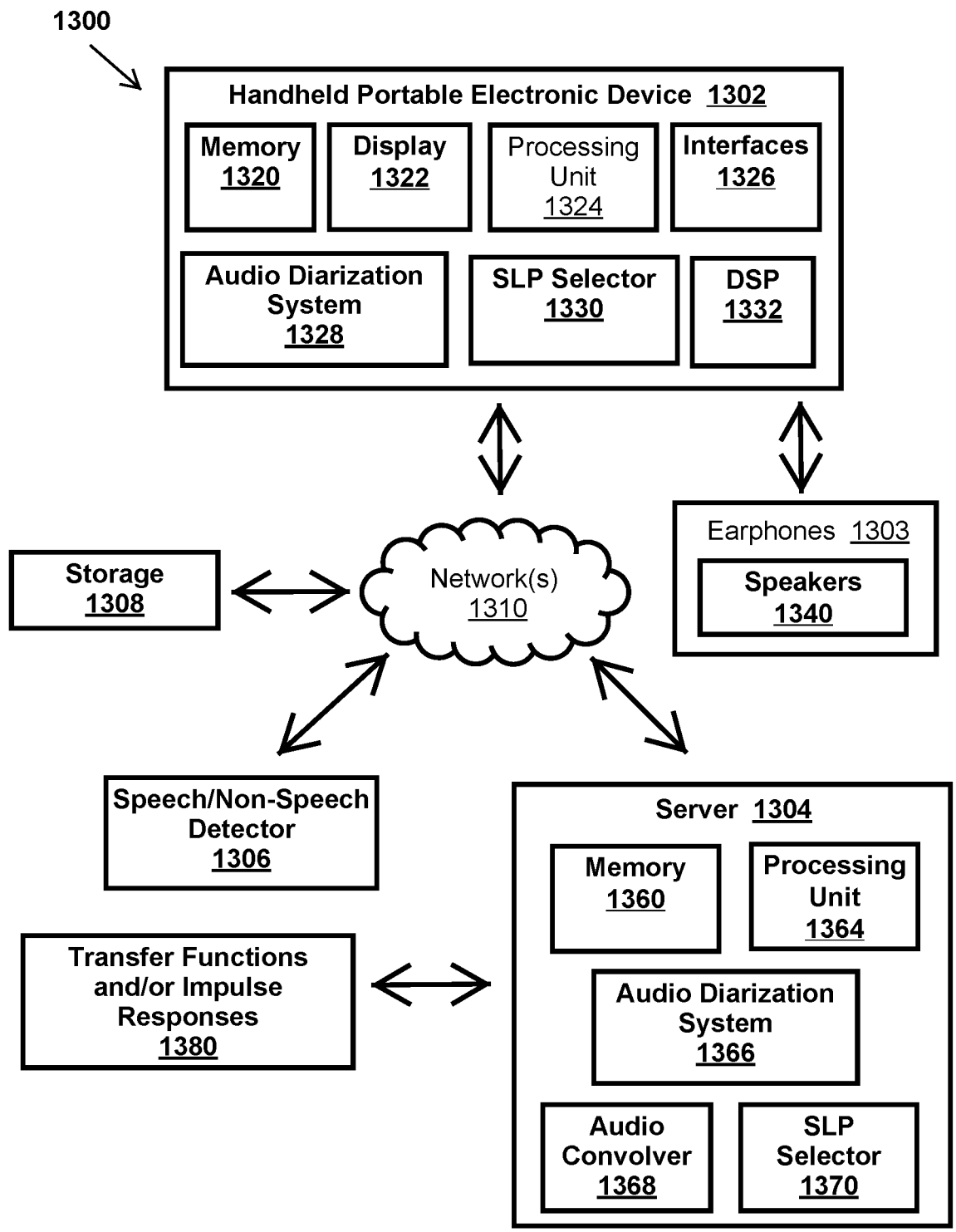
FIG. 13 is a computer system or electronic system in accordance with an example embodiment.

FIG. 13 is a computer system or electronic system 1300 in accordance with an example embodiment. The system includes a handheld portable electronic device or HPED 1302, a computer or electronic device (such as a server) 1304, a speech and/or non-speech detector 1306, and storage or memory 1308 that includes audio files in communication with each other over one or more networks 1310.

The handheld portable electronic device 1302 includes one or more components of computer readable medium (CRM) or memory 1320, a display 1322, a processing unit 1324 (such as one or more microprocessors and/or microcontrollers), one or more interfaces 1326 (such as a network interface, a graphical user interface, a natural language user interface, a natural user interface, a phone control interface, a reality user interface, a kinetic user interface, a touchless user interface, an augmented reality user interface, and/or an interface that combines reality and virtuality), an audio diarization system 1328, a sound localization point (SLP) selector 1330, and a digital signal processor (DSP) 1332.

The HPED 1302 can communicate with headphones or earphones 1303 that include speakers 1340 or other electronics (such as microphones).

The storage 1308 can include memory or databases that store one or more of audio files or audio input, SLPs (including other information associated with a SLP such as rich media, sound files and images), user profiles and/or user preferences (such as user preferences for SLP locations and sound localization preferences), impulse responses and transfer functions (such as HRTFs, HRIRs, BRIRs, and RIRs), and other information discussed herein.

The network 1310 can include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices can couple together via one or more wires, such as a direct wired-connection. As another example, electronic devices can communicate directly through a wireless protocol, such as Bluetooth, near field communication (NFC), or other wireless communication protocol.

Electronic device 1304 (shown by way of example as a server) includes one or more components of computer readable medium (CRM) or memory 1360, a processing unit 1364 (such as one or more microprocessors and/or microcontrollers), an audio diarization system 1366, an audio convolver 1368, and a SLP selector 1370.

The electronic device 1304 communicates with storage or memory 1380 that stores transfer functions and/or impulse responses (e.g., HRTFs, HRIRs, BRIRs, etc. for multiple users).

The speech and/or non-speech detector 1306 detects speech and/or non-speech in an audio file or audio input.

Figure 14:
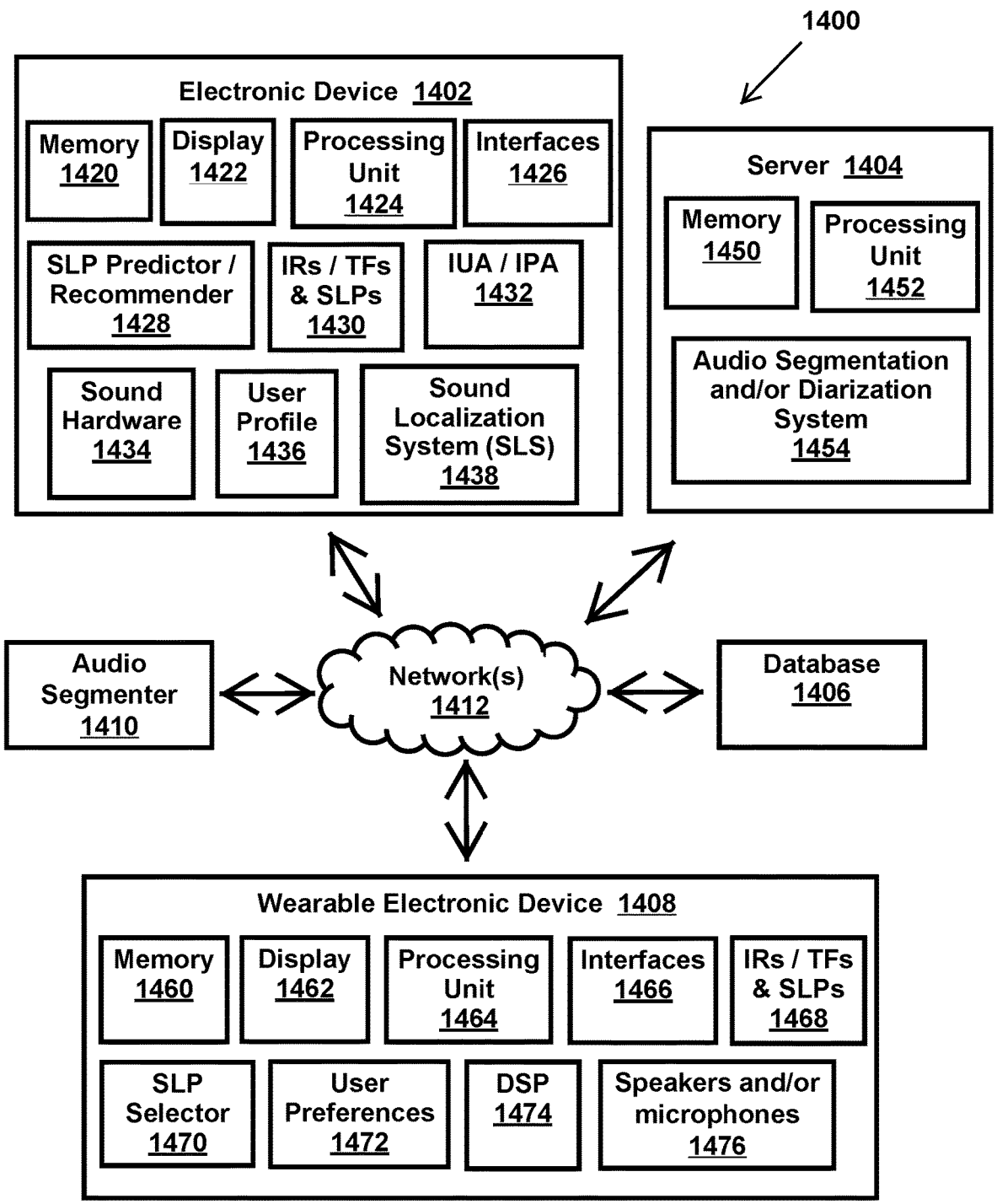
FIG. 14 is another computer system or electronic system in accordance with an example embodiment.

FIG. 14 is a computer system or electronic system in accordance with an example embodiment. The system 1400 includes an electronic device 1402, a server 1404, a database 1406, a wearable electronic device 1408, and an audio segmenter 1410 in communication with each other over one or more networks 1412.

Electronic device 1402 includes one or more components of computer readable medium (CRM) or memory 1420, one or more displays 1422, a processor or processing unit 1424 (such as one or more microprocessors and/or microcontrollers), one or more interfaces 1426 (such as a network interface, a graphical user interface, a natural language user interface, a natural user interface, a phone control interface, a reality user interface, a kinetic user interface, a touchless user interface, an augmented reality user interface, and/or an interface that combines reality and VR), a SLP predictor and/or recommender 1428, impulse responses (IRs), transfer functions (TFs), and/or SLPs 1430, an intelligent user agent (IUA) and/or intelligent personal assistant (IPA) 1432 (also referred to as a virtual assistant), sound hardware 1434, a user profile builder and/or user profile 1436, and a sound localization system (SLS) 1438.

The sound localization system 1438 performs various tasks with regard to managing, generating, interpolating, extrapolating, retrieving, storing, and selecting SLPs and can function in coordination with and/or be part of the processing unit and/or DSPs or can incorporate DSPs. These tasks include generating audio impulses, generating audio impulse responses or transfer functions for a person, dividing an area around a head of a person into zones or areas, determining what SLPs are in a zone or area, mapping SLP locations and information for subsequent retrieval and display, selecting SLPs when a user is at a determined location, selecting sets of SLPs according to circumstantial criteria, generating user interfaces with binaural sound information, detecting binaural sound, detecting human speech, isolating voice signals from sound such as the speech of a person who captures binaural sound by wearing microphones at the left and right ear, and/or SLP information, and executing one or more other blocks discussed herein. The sound localization system can also include a sound convolving application that convolves and deconvolves sound according to one or more audio impulse responses and/or transfer functions based on or in communication with head tracking.

Server 1404 includes computer readable medium (CRM) or memory 1450, a processor or processing unit 1452, and an audio segmentation and/or diarization system 1454.

By way of example, an intelligent personal assistant or intelligent user agent is a software agent that performs tasks or services for a person, such as organizing and maintaining information (such as emails, calendar events, files, to-do items, etc.), responding to queries, performing specific one-time tasks (such as responding to a voice instruction), performing ongoing tasks (such as schedule management and personal health management), and providing recommendations. By way of example, these tasks or services can be based on one or more of user input, prediction, activity awareness, location awareness, an ability to access information (including user profile information and online information), user profile information, and other data or information.

The database 1406 stores information discussed herein, such as user profiles, user preferences, SLPs for users, audio files and audio input, transfer functions and impulse responses for users, etc.

Wearable electronic device 1408 includes computer readable medium (CRM) or memory 1460, one or more displays 1462, a processor or processing unit 1464, one or more interfaces 1466 (such as an interface discussed herein), one or more impulse response data sets, transfer functions, and SLPs 1468, a sound localization point (SLP) selector 1470, user preferences 1472, a digital signal processor (DSP) 1474, and one or more of speakers and microphones 1476.

By way of example, the sound hardware 1434 includes a sound card and/or a sound chip. A sound card includes one or more of a digital-to-analog (DAC) converter, an analog-to-digital (ATD) converter, a line-in connector for an input signal from a sound source, a line-out connector, a hardware audio accelerator providing hardware polyphony, and one or more digital-signal-processors (DSPs). A sound chip is an integrated circuit (also known as a "chip") that produces sound through digital, analog, or mixed-mode electronics and includes electronic devices such as one or more of an oscillator, envelope controller, sampler, filter, and amplifier.

By way of example, a computer and an electronic device include, but are not limited to, handheld portable electronic devices (HPEDs), wearable electronic glasses, watches, wearable electronic devices (WEDs) or wearables, smart earphones or hearables, voice control devices (VCD), network attached storage (NAS), printers and peripheral devices, virtual devices or emulated devices, portable electronic devices, computing devices, electronic devices with cellular or mobile phone capabilities, digital cameras, desktop computers, servers, portable computers (such as tablet and notebook computers), smartphones, electronic and computer game consoles, home entertainment systems, handheld audio playing devices (example, handheld devices for downloading and playing music and videos), appliances (including home appliances), personal digital assistants (PDAs), electronics and electronic systems in automobiles (including automobile control systems), combinations of these devices, devices with a processor or processing unit and a memory, and other portable and non-portable electronic devices and systems (such as electronic devices with a DSP).

The SLP predictor or recommender 1428 predicts, estimates, and/or recommends events including, but not limited to, switching or changing between binaural, mono, and stereo sounds at a future time, changing or altering binaural sound (such as moving a SLP, reducing a number of SLPs, eliminating a SLP, adding a SLP, starting transmission or emission of binaural sound, stopping transmission or emanation of binaural sound, etc.), predicting an action of a user, predicting a location of a user, predicting an event, predicting a desire or want of a user, predicting a query of a user (such as a query to an intelligent personal assistant), predicting and/or recommending a SLP or RIR/RTF to a user, etc. The predictor can also predict user actions or requests in the future (such as a likelihood that the user or electronic device localizes a type of sound to a particular SLP). For instance, determinations by a software application, an electronic device, and/or the user agent can be modeled as a prediction that the user will take an action and/or desire or benefit from moving or muting an SLP, from delaying the playing of a sound, from a switch between binaural, mono, and stereo sounds or a change to binaural sound (such as pausing binaural sound, muting binaural sound, reducing or eliminating one or more cues or spatializations or localizations of binaural sound). For example, an analysis of historic events, personal information, geographic location, and/or the user profile provides a probability and/or likelihood that the user will take an action (such as whether the user prefers binaural sound or stereo, or mono sound for a particular location, a particular listening experience, or a particular communication with another person or an intelligent personal assistant). By way of example, one or more predictive models execute to predict the probability that a user would take, determine, or desire the action. The predictor can also predict future events unrelated to the actions of the user, for example, the prediction of the times, locations, SLP positions, type or quality of sound, or identities of incoming callers or requests for sound localizations to the user.

Figure 15:
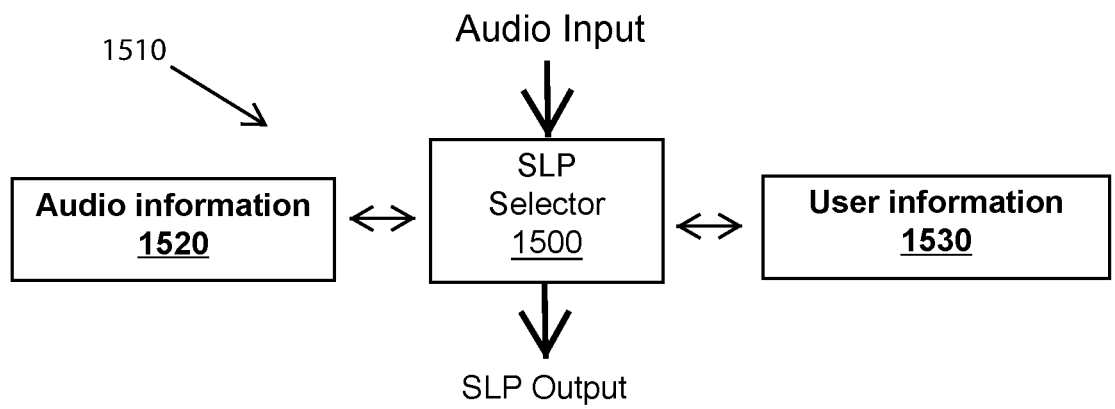
FIG. 15 is a SLP selector in an electronic system in accordance with an example embodiment.

FIG. 15 is a SLP selector 1500 in an electronic system 1510 in accordance with an example embodiment. The SLP selector 1500 receives audio input, analyzes the audio input, selects one or more SLPs, HRTFs, and/or RIRs for adjusting the audio input, and provides as output the one or more SLP, HRTF and/or RIR selections and/or other information discussed herein.

In addition to the audio input, the SLP selector 1500 can couple to or communicate with audio information 1520 and user information 1530.

The SLP selector can receive as input and/or query the OS or other system resources to obtain for consideration the audio information 1520. By way of example, this information includes, but is not limited to, one or more of current time and/or date, user location, positional and orientation information of a user, context of a user, active sound and localization information, and other information.

The user information 1530 can include information from one or more storage devices, memory, databases, or other information sources. By way of example, this information includes, but is not limited to, one or more of user preferences, call logs, localization logs, and user contact lists.

Consider an example embodiment of a SLP selector that considers both a sound type (or unique audio fingerprint (sound ID)) and one or more sources of the sound in determining a SLP for a sound. The SLP selector receives as input a unique segment identification (segment ID) that distinguishes for what segment a SLP is being requested. The SLP selector can also receive an identification of a type of sound (sound type) included in the segment, if known. For example, the SLP selector receives a unique sound ID for the segment.

The segment ID allows the SLP selector to look up the input source of the segment in a table that lists the segments known by the system and the source to which the segment belongs. In this example embodiment, the segment ID is a required argument, and both the sound type and sound ID are optional arguments. If a sound type is not passed to the SLP selector then a determination is made of the sound type or probable sound type based on the sound ID (if known), sound source, analysis of the segment or other data, or other methods described herein. The SLP selector returns as output a SLP, HRTF, or RIR designation for the segment ID passed as the input argument.

In an example embodiment, the SLP selector has access to other information that the SLP selector can consider in order to make localization or impulse response selections. The other information includes, but is not limited to, the other active SLPs or segments currently localizing or assigned for localizing and the HRTFs or RIRs assigned to them, the current time and date, the user's location, the user's position in the environment relative to other objects such as microphones and speakers and barriers such as those that bear on attenuation and reverberation, the user's context or situational information (such as in a car, driving a car, in a meeting, sleeping, on duty, performing a strenuous or hazardous activity, on public transportation, has a active head-tracking system, is in a visually rendered space such as wearing a head-mounted display, etc.), and other information available to the system.

In addition, the example embodiment has access to memory or storage, such as one or more databases for referencing and/or updating. One such database is a contact list (for example a user's personal contact list) that includes people and other contact information along with SLPs, HRTFs and/or IRs already designated for convolving the sound of a contact. Another database is a call log or localization log that includes a historic archive of segments played to the user, such as voices and other sounds along with SLPs, HRTFs and/or other IRs processed to convolve the sounds or segments, and other information about the events when a segment was played or localized to a user. Another database is the user's preference database that can provide preferred SLP designations that the SLP selector can return as output, or take into account when making a designation that compares and weighs multiple factors.

Records in the databases, such as those mentioned above, can also have associated with them a unique sound identifier (sound ID), such as a value generated from, obtained by, or including a voiceprint, voice-ID, voice recognition service, or other unique voice identifier such as one produced by a voice recognition system. For example, a number of MFCCs are extracted from a voice signal to form a model using a GMM algorithm. The model, model identifier, or hash of a model or model file is processed as the sound ID. The sound ID can also include a unique sound identifier for sounds that include or do not include voices, such as a value generated from, obtained by, or including an acoustic fingerprint, sound signature, sound sample, a hash of a sound file, spectrographic model or image, acoustic watermark, or audio based Automatic Content Recognition (ACR). The segment's supplied or computed sound ID can be compared with or matched with a sound ID from a record in a database in order to identify or assist to identify a segment's sound type or origin as one already known by a database. For example, a sound ID computed for a segment of an incoming voice from an unknown caller is determined to match a sound ID associated with the contact labeled as "Jeff" in the user's contact database. The match is a sufficient indication that the identity of the caller is Jeff. The SLP selector looks up the HRTFs processed in a previous conversation with Jeff, and after assuring the localization does not clash with, is not coincident with, or is not functionally or otherwise incompatible with other SLPs, returns the HRTFs as output for convolving the segment.

After the SLP selector provides as output the designation of a SLP, HRTF, or other IRs, the SLP selector directs one or more of the databases to be updated with the information about the designation instance. For example, a HRTF is designated for a segment that includes the voice of a new friend of the user, and the localization log is appended with the identity of the new friend, the HRTF designated, and other call information. The user's contact database is updated with the HRTF as a default SLP for future conversations with the friend. The user's preferences are updated to include the knowledge of the HRTF assignment for the friend, the time of day, location, and other circumstances bearing on his preference.

Consider a number of examples that illustrate the SLP selector designating localizations based on various combinations of limited or specific knowledge.

An example embodiment determines a SLP by considering one or more of a sound source, an identity of a voice, a current time of day, call history, and the presence of another SLP. Based on this information, the example embodiment creates a SLP at a location or in a general area expected by the user. For example, Bob receives a call at 9:00 A.M. The caller and sound type are not determined. The SLP selector consults Bob's localization log and determines that 60% of telephone calls received between 8:30 A.M. and 10:00 A.M. are localized to a certain HRTF-1. In response to this determination, the SLP selector outputs HRTF-1 as the designation for the sound of the call. While still on the call Bob receives a call from the automated weather reporting service. The SLP selector determines from the weather service record in Bob's contact list that calls from the weather service are set to auto-answer and considers a default localization of HRTF-1. The SLP selector consults a list of currently active SLPs and determines that HRTF-1 has already been provided to an active convolution process (for a segment on a current telephone call). The SLP selector avoids localizing more than one segment to one SLP, and so the SLP selector consults Bob's localization or call log for an alternative SLP that would not surprise Bob. An examination of the localization log, however, determines that Bob has not localized the weather service voice to other SLPs besides HRTF-1. The SLP selector calculates a new alternative point for the localization of the incoming voice from the weather service by adjusting two coordinates of the usual SLP of the weather service (HRTF-1). The distance is increased by 2 feet, and the elevation is increased by 15°. The adjusted HRTF is output by the SLP selector, sent to the DSP, and processed to convolve the sound of the weather-reporting voice. Bob hears the weather report at a location shifted from the usual location but at an adjusted location that is not unexpected.

An example embodiment determines a SLP by considering a context of a user, and weighing a user's call history without knowledge of the identity of a caller. As an example, Bob receives a call at 9:00 A.M while he is wearing a head-mounted display (HMD). The caller and sound type are not determined. The SLP selector consults Bob's localization log and determines that 60% of telephone calls received between 8:30 A.M. and 10:00 A.M. are localized to a certain HRTF-1, and that 70% of calls received while Bob's context is "HMD active" are localized internally. The SLP selector designates an internalized localization for the sound of the call.

An example embodiment determines a SLP and RIR by considering a user's GPS location and position and orientation in a room, and without knowing the identity of a voice or music type. As an example, Alice receives a broadcast of speech sound, and left and right stereo music segments while she is supine at Jazz Hands, her regular massage spa in her regular room number 202. The speaker in the voice segment and the sound type of the music are not identified. During her massages, Alice prefers to hear voices emanate at approximately the surface of the 3.5 m high ceiling while she is relaxing face up on the massage table. The SLP selector consults Alice's localization log and determines that when Alice is at the current GPS coordinates (the address of Jazz Hands) she localizes music internally and speech at (3 m, 0°, 0°). Based on her location and the sound types determined in the segments on the incoming broadcast, the SLP selector designates the voice segment to localize at (3 m, 0°, 0°) and the left and right music segments to localize in stereo. Later, Alice is moved to a massage table beside the wall in a different room that has a ceiling height of 2.5 m. The SLP selector detects or is notified of the event of the location change and retrieves updated positional information, such as an indication of the new room dimensions and her position and orientation in the room. The SLP selector adjusts the SLP of the speech segment to a distance of 2 m to match the lower ceiling. Due to the new information that a large flat solid object (a wall) is directly to her left, the SLP selector outputs a designation for an appropriate RTF. The RTF is convolved with the sound of the speech to mimic a reverberation that Alice would hear due to the close proximate wall if the sound were originating in her physical environment. Alice continues to hear the stereo music in stereo sound without change. She hears the speech sound changed to sound as though it emanates two meters away, from a ceiling-mounted speaker near the wall that is at her left.

An example embodiment determines SLP placements and activations by considering a user's head orientation relative to a device and relative to his body. For example, Bob is in his home office where a personal computer (PC) is in front of him on his desk and a smart TV is facing him on his right. His wearable electronic device (WED) headphones with orientation tracking or head tracking are coupled to his PC and to his TV. A SLP selector designates the audio sources incoming from his TV to two "virtual speakers," a SLP-Left1 and a SLP-Right1 that are located at fixed positions to the left and right of his head relative to his head. When Bob's head faces his PC, the incoming sound sources from his PC web browser are assigned by the SLP selector to localize at two "virtual speakers," a SLP-Left2 and a SLP-Right2 that are located at fixed positions to the left and right of his PC relative to his PC. When Bob turns his head or his body in the chair to face away from his PC (such as to face his TV) the SLP selector is notified or finds updates of Bob's new orientation and the segments incoming from his PC are paused or muted. Bob hears the TV audio to the left and right of his head, but he does not hear the PC audio unless he is facing the PC. Bob can monitor the TV audio while he works on his PC and when he turns to face the TV the PC audio is silenced until the time that Bob returns his gaze toward the PC. The SLP selector makes determinations of the locations and activations of the four SLPs according to the audio sources and the location and orientation of Bob's head. Bob's IPA speaks an alert notifying Bob of an impending appointment and the voice segment is considered for localization by the SLP selector that then designates a localization for the voice at the usual SLP coordinate at his left shoulder relative to his shoulders. When Bob faces the PC, he hears the sound from each of the five SLPs. When he turns his head to face the TV, without moving his body, the SLP selector mutes or pauses the segments from his web browser, continues to localize the TV segments at HRTF-Left1 and HRTF-Right1, and adjusts the HRTFs for the localization of the IPA to compensate for the change in Bob's head orientation. As such, Bob continues to perceive the voice of the IPA rendered at his left shoulder.

An example embodiment determines a SLP location by weighing multiple possible default designations and by considering a user's location relative to a stationary device. In another example, Bob exits his home office, walks to the kitchen, puts some frozen peas in the microwave oven to defrost, walks back to his desk and continues to work. When the peas are defrosted ten minutes later, the smart microwave appliance calls Bob by triggering an alert composed of artificial speech to play on Bob's personal computer (PC). This sound alerts him that the microwave oven's task is complete. The PC operating system (OS) passes the sound of the alert to an audio segmenter that determines existence of a single segment of sound in the sound source. The segment ID of the segment is passed to the SLP selector, the SLP selector looks up the segment ID, and finds that the sound source is the smart appliance application that communicates with the microwave. The SLP selector consults the user preferences, contact list, and localization history but finds no record of localizing the smart appliance sounds or record of the sound ID of the voice in the alert. The SLP selector discovers that a default SLP specified by the smart appliance application exists for sounds triggered by the smart appliance application. The default SLP is fixed at six inches in front of the microwave door with respect to the microwave. The SLP selector translates the default SLP location six inches from the microwave in the kitchen to a location relative to Bob's head located in Bob's office fifteen meters away. The SLP selector confirms that the proposed SLP fifteen meters away from Bob's head does not conflict with another current localization. The SLP selector returns the SLP with a translated position as output for processing by the audio convolver to render the speech alert to Bob. Bob in the home office hears a voice in the kitchen speak, "Your food is no longer frozen."

The SLP selector output may result in no change of a segment's sound. In calculating a SLP that provides a familiar experience to a user, an example embodiment can decide not to localize a segment of a known type, even if default SLPs exist for the sound type. The example embodiment can also weigh a user's context with safety regulations, can restrict a localization in consideration of a user's environment, and can prioritize multiple contexts. For example, Bob is playing a game that includes binaural sound on his HPED while his self-driving car drives him through the city. The sounds from the game are not passed to an audio segmentation system or audio diarization system so the game's sounds exist to the HPED OS as a single segment of two-channel binaural sound. The OS passes the segment ID for the sounds from the game to the SLP selector. The SLP selector is unable to find additional localization information or references associated with the sound source or segment, such as a sound type, sound ID, or default SLP specified by the game application. Bob has not previously modified the localization of the game sound through his HPED SLS, and no records of such an event exist. If the SLP selector designated a new SLP for the game sound, Bob would find the new location unfamiliar. The SLP selector then has no directive to localize the game sound associated with the segment ID, and the binaural game sound is output to Bob without convolution by the SLS and this results in a consistent experience for Bob. Later in the drive, the car switches to human assisted mode in an area with road construction. The SLP selector detects or is notified of the change in Bob's context from "car passenger" to "car driver." As required by safety regulation in Bob's area, the SLP selector adjusts active sound segments to output as internalized sound. The sound of the game is switched from binaural sound that localizes to Bob to mono sound that does not externally localize to Bob. Later in the drive when externalized sound is permitted in the car, Bob calls Alice. The SLP selector looks up the SLP assigned by default to segments that include the voice of Alice. The SLP selector determines that the default SLP for Alice's voice is beyond the perimeter of the interior of the car. So as not to provide an unexpected localization, the SLP selector reduces the distance coordinate of the default SLP to a value within the perimeter of the interior of the car. The azimuth and elevation coordinates are not altered. The SLP selector is aware that Bob's context is still inside a car. So as to provide a familiar audio experience, the SLP selector designates a RIR for convolving Alice's voice segment and Bob hears Alice's voice with a reverberation matching the acoustic characteristics of the car.

This example embodiment can select SLPs and RIRs by considering both a user's physical location and virtual location. For example, Bob parks the car and turns off the engine during his conversation with Alice and continues to localize her voice at a SLP within the perimeter of the car. Her voice is convolved with RIRs that match the acoustic qualities of her voice to the acoustic qualities that her voice would exhibit to Bob if Alice were in the car together with him. Alice asks Bob to meet her at a virtual place called BarVR, a visually rendered virtual space with a ceiling height of ten meters. Bob dons a HMD, virtually navigates to and enters BarVR while sitting in his car, and sees with the HMD display the visual representation of Alice in BarVR. Bob selects the visual representation of Alice and issues a command to open an audio connection, and this command initiates a binaural telephone call to Alice. Alice accepts the call request and greets Bob with, "Hi Bob, it's so much more comfortable in here!" The telephony software application that has established the call, streams Alice's greeting to Bob's device. An audio segmenter begins to diarize the incoming sound stream from Alice and identifies and establishes a single voice segment. The voice recognition system calculates a sound ID for the voice. The segment ID and sound ID are submitted to a SLP selector. The SLP selector looks up the segment ID and finds that the segment's source is the telephony application. The SLP selector looks up the sound ID and finds that it matches the voice of Alice in Bob's contact database. The SLP selector finds the default SLP associated with Alice in the contact record for Alice in Bob's contact database. The SLP selector also determines that a first context of Bob is "car passenger" and a second context for Bob is "HMD active." Although the default SLP for Alice has a distance coordinate that is greater than the diameter of the interior of the car, the SLP selector recognizes or determines that Bob's second context supersedes the first context. Accordingly, the SLP selector returns the coordinates of the default localization for Alice retrieved from Bob's contact database. The voice of Alice is convolved to a SLP that Bob expects for Alice during telephony. Bob hears the voice of Alice from a point that is farther away than the car doors around Bob. This point of localization is not unexpected by Bob because it is consistent with the environment he sees with the HMD. Hence, the distance of the voice of Alice from Bob is not uncomfortable or disorienting for Bob. Although Bob is located inside his car, he perceives himself within the room of BarVR and the placement of the voice of Alice makes sense to him. Additionally, the SLP selector determines to convolve the voice of Alice with RIRs. Convolving the voice causes Alice's voice to sound to Bob as if both Bob and Alice are in the BarVR with a ceiling height that is ten meters high.

An example embodiment determines a SLP location by considering the probability of sound arrival times, a user's location, and the nature of the location. For example, Bob is subscribed to a binaural audio tweet service called Floating Head. At unpredicted times throughout the day and night, the Floating Head client application executing on his HPED receives binaural audio messages from the service and plays them. Before Bob hears the audio files, they are processed by the audio segmenter that identifies sound types and assigns segment IDs. The segment IDs and sound types are passed to the SLP selector. The SLP selector consults Bob's localization log and learns that usually sounds that come from the Floating Head client application are localized two meters from Bob. The localization log data also shows that Bob is usually at home when he receives the sounds. One day, Bob is at the airport and receives a sound from Floating Head. The SLP selector retrieves data from Bob's phone indicating that Bob is at the airport, a crowded place. Based on Bob's location, the SLP selector makes a determination to assign a SLP that is one meter from Bob. The determination is made so that Bob does not experience the unexpected Floating Head voice in the crowded place at a localization where he might mistake the binaural sound voice for actual voices from the people around him.

Figure 16:
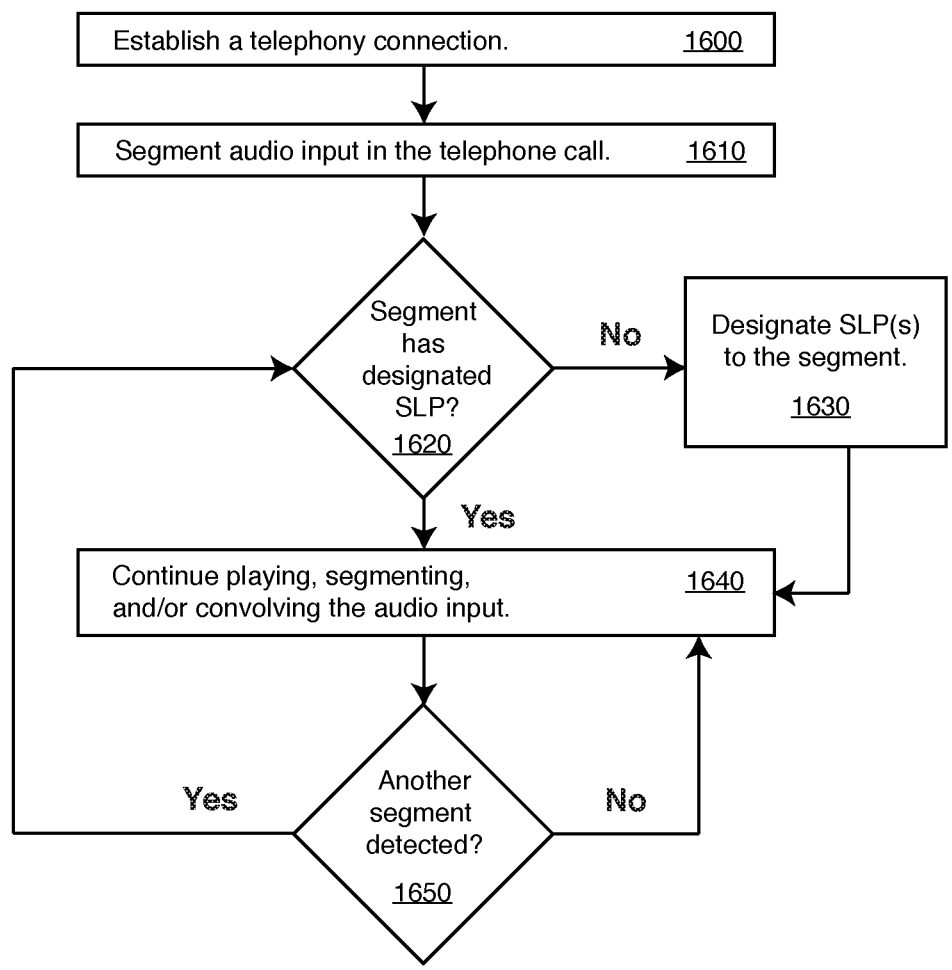
FIG. 16 is a method to designate a sound localization point (SLP) to a telephone call in accordance with an example embodiment.

FIG. 16 is a method to designate a sound localization point (SLP) to a telephone call in accordance with an example embodiment.

Block 1600 states establish a telephony connection.

For example, a user places or receives a telephone call.

Block 1610 states segment audio input in the telephone call.

For example, an audio diarization system or other system discussed herein segments audio input in the telephone call. For instance, audio input transmitted to or received by a user is segmented.

Block 1620 makes a determination as to whether a segment has a designated SLP. If the answer to this determination is "no" then flow proceeds to block 1630 that states designate SLP(s) to the segment. If the answer to this determination is "yes" then flow proceeds to block 1640 that states continue playing, segmenting, and/or convolving the audio input.

Block 1650 makes a determination as to whether another segment is detected. If the answer to this determination is "yes" then flow proceeds back to block 1620. If the answer to this determination is "no" then flow proceeds back to block 1640.

Consider an example in which Alice commences a telephone call with Charlie. A sound localization system (SLS) retrieves a preferred SLP for Charlie and provides Charlie's voice to Alice at the preferred SLP. During the telephone call, Charlie's friend (Bob) says "Hello Alice." The system recognizes a new or different voice from Charlie, retrieves a preferred SLP for Bob, and provides Bob's voice to Alice at a SLP that is different than the SLP of Charlie.

Consider an example in which Alice commences a telephone call with Bob. The audio diarization system segments Bob's voice and externally localizes his voice to a designated SLP obtained from Alice's user preferences. During the call, Alice's intelligent personal assistant (Hal) talks to Alice. The audio diarization system identifies Hal as an additional segment, retrieves a SLP for Hal, and convolves Hal's voice so it externally localizes to a designated SLP obtained from Alice's user preferences.

The SLS, SLP selector, or other application can consider one or more factors in selecting a SLP and determining where to place a sound for a user. By way of example, these factors can include one or more of current time, location, position, orientation, the location and identity of other localized sounds, the current context of a user, identity of a software application, identity of a process making a request, identity of a voice or person, identity of an electronic device, and other factors discussed herein. Furthermore, these factors can be weighted equally or weighted differently in selecting a SLP.

Example embodiments include instances in which audio input is diarized or segmented and instances in which the audio input is not diarized or segmented.

Consider an example in which sounds from a software application pass thru or bypass an audio diarization system without being segmented. For example, the software application (or other sound source) provides sound with a known segmentation. Alternatively, the user may not want the sound segmented, or the sound may be known to have a single voice or a single sound, and segmentation is not necessary.

Example embodiments are not limited to HRTFs but also include other sound transfer functions and sound impulse responses including, but not limited to, head related impulse responses (HRIRs), room transfer functions (RTFs), room impulse responses (RIRs), binaural room impulse responses (BRIRs), binaural room transfer functions (BRTFs), headphone transfer functions (HPTFs), etc.

As used herein, an "electronic call" or a "telephone call" is a connection over a wired and/or wireless network between a calling person or user and a called person or user. Telephone calls can use landlines, mobile phones, satellite phones, HPEDs, computers, and other portable and non-portable electronic devices. Further, telephone calls can be placed through one or more of a public switched telephone network, the internet, and various types of networks (such as Wide Area Networks or WANs, Local Area Networks or LANs, Personal Area Networks or PANs, Campus Area Networks or CANs, etc.). Telephone calls include other types of telephony including Voice over Internet Protocol (VoIP) calls, internet telephone calls, in-game calls, etc.

As used herein, "familiar" means generally know or easy to recognize because of being seen or heard before.

As used herein, "proximate" means near. For example, a sound that localizes proximate to a person occurs between one foot to five feet from the person.

As used herein, a "sound localization point" or "SLP" is a location where a listener localizes sound. A SLP can be internal (such as monaural sound that localizes inside a head of a listener), or a SLP can be external (such as binaural sound that externally localizes to a point or an area that is away from but proximate to the person or away from but not near the person). A SLP can be a single point such as one defined by a single pair of HRTFs or a SLP can be a zone or shape or volume or general area. Further, in some instances, multiple impulse responses or transfer functions can be processed to convolve sounds or segments to a place within the boundary of the SLP. In some instances, a SLP may not have access to a particular HRTF necessary to localize sound at the SLP for a particular user, or a particular HRTF may not have been created. A SLP may not require a HRTF in order to localize sound for a user, such as an internalized SLP, or a SLP may be rendered by adjusting an ITD and/or ILD or other human audial cues.

As used herein, a "user" can be a person (i.e., a human being), an intelligent personal assistant (IPA), a user agent (including an intelligent user agent and a machine learning agent), a process, a computer system, a server, a software program, hardware, an avatar, or an electronic device. A user can also have a name, such as Alice, Bob, Chip, Hal, and other names as described in some example embodiments. As used herein a "caller" or "party" can be a user.

As used herein, a "user agent" is software that acts on behalf of a user. User agents include, but are not limited to, one or more of intelligent user agents and/or intelligent electronic personal assistants (IPAs, software agents, and/or assistants that use learning, reasoning and/or artificial intelligence), multi-agent systems (plural agents that communicate with each other), mobile agents (agents that move execution to different processors), autonomous agents (agents that modify processes to achieve an objective), and distributed agents (agents that execute on physically distinct electronic devices).

Examples herein can take place in physical spaces, in computer rendered spaces (such as computer games or VR), in partially computer rendered spaces (AR), and in combinations thereof.

The processor unit includes a processor (such as a central processing unit, CPU, microprocessor, microcontrollers, field programmable gate arrays (FPGA), application-specific integrated circuits (ASIC), etc.) for controlling the overall operation of memory (such as random access memory (RAM) for temporary data storage, read only memory (ROM) for permanent data storage, and firmware). The processing unit and DSP communicate with each other and memory and perform operations and tasks that implement one or more blocks of the flow diagrams discussed herein. The memory, for example, stores applications, data, programs, algorithms (including software to implement or assist in implementing example embodiments) and other data.

Consider an example embodiment in which the SLS or portions of the SLS include an integrated circuit FPGA that is specifically customized, designed, configured, or wired to execute one or more blocks discussed herein. For example, the FPGA includes one or more programmable logic blocks that are wired together or configured to execute combinational functions for the SLS.

Consider an example in which the SLS or portions of the SLS include an integrated circuit or ASIC that is specifically customized, designed, or configured to execute one or more blocks discussed herein. For example, the ASIC has customized gate arrangements for the SLS. The ASIC can also include microprocessors and memory blocks (such as being a SoC (system-on-chip) designed with special functionality to execute functions of the SLS).

Consider an example in which the SLS or portions of the SLS include one or more integrated circuits that are specifically customized, designed, or configured to execute one or more blocks discussed herein. For example, the electronic devices include a specialized or custom processor or microprocessor or semiconductor intellectual property (SIP) core or digital signal processor (DSP) with a hardware architecture optimized for convolving sound and executing one or more example embodiments.

Consider an example in which the HPED includes a customized or dedicated DSP that executes one or more blocks discussed herein. Such a DSP has a better power performance or power efficiency compared to a general-purpose microprocessor and is more suitable for a HPED, such as a smartphone, due to power consumption constraints of the HPED. The DSP can also include a specialized hardware architecture, such as a special or specialized memory architecture to simultaneously fetch or pre-fetch multiple data and/or instructions concurrently to increase execution speed and sound processing efficiency. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

Consider an example in which the DSP includes the SLP selector and/or the audio diarization system. For example, the SLP selector, audio diarization system, and/or the DSP are integrated onto a single integrated circuit die or integrated onto multiple dies in a single chip package to expedite binaural sound processing.

Consider an example in which the DSP additionally includes the voice recognition system and/or acoustic fingerprint system. For example, the audio diarization system, acoustic fingerprint system, and a MFCC/GMM analyzer and/or the DSP are integrated onto a single integrated circuit die or integrated onto multiple dies in a single chip package to expedite binaural sound processing Consider another example in which HRTFs (or other transfer functions or impulse responses) are stored or cached in the DSP memory to expedite binaural sound processing.

Consider an example in which a smartphone or other HPED includes one or more dedicated sound DSPs (or dedicated DSPs for sound processing, image processing, and/or video processing). The DSPs execute instructions to convolve sound and display locations of the SLPs of the sound on a user interface of the HPED. Further, the DSPs simultaneously convolve multiple SLPs to a user.

These SLPs can be moving with respect to the face of the user so the DSPs convolve multiple different sound signals and sources with HRTFs that are continually, continuously, or rapidly changing.

Example embodiments are not limited to a particular type of audio system that segments sound, diarizes sound, performs speech recognition, performs speech and/or voice identification, performs sound identification, and performs other tasks with example embodiments discussed herein. By way of example, such an audio system can include one or more of an audio diarization system, a voice and/or speech recognition system, a speaker diarization system, a speech and/or sound segmentation system, and other audio systems in accordance with example embodiments.

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

The methods in accordance with example embodiments are provided as examples, and examples from one method should not be construed to limit examples from another method. Tables and other information show example data and example structures; other data and other database structures can be implemented with example embodiments. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method comprising:
    determining, by a smartphone, a familiar sound localization point (SLP) by analyzing SLPs in prior telephone calls where voices in the prior telephone calls externally localized as binaural sound to a person;
    processing, by the smartphone, a voice in a telephone call so the voice externally localizes as binaural sound from the familiar SLP that is external to the person and at a far field distance from the person; and
    providing, by the smartphone and to earphones or headphones, the voice in the binaural sound to the person so the voice externally localizes from the familiar SLP that is external to the person and at the far field distance from the person.

2. The method of claim 1, further comprising:
    executing speech recognition to identify the voice in the telephone call; and
    determining, by the smartphone, that the familiar SLP is assigned to the voice identified with the speech recognition.

3. The method of claim 1, further comprising:
receiving, during the telephone call that includes voices from multiple different people whose voices internally localize to the person, a command to move one of the voices to externally localize while other ones of the voices from the multiple different people remain internally localized.

4. The method of claim 1, further comprising:
segmenting, by the smartphone, sounds during the telephone call so one of the sounds internally localizes inside a head of the person as mono or stereo sound and another one of the sounds externally localizes to the person as the binaural sound to the familiar SLP.

5. The method of claim 1, further comprising:
prefetching, by the smartphone and before the telephone call commences, head-related transfer functions (HRTFs) in order to increase execution speed of processing the voice in the telephone call.

6. The method of claim 1, further comprising:
assigning telephone numbers to the SLPs;
storing, in memory of the smartphone, the telephone numbers and the SLPs; and
retrieving, from the memory, a SLP for a telephone number of a caller upon identifying the telephone number.

7. The method of claim 1 further comprising:
caching, by the smartphone and before the telephone call commences, head-related transfer functions (HRTFs) in order to increase execution speed of processing the voice in the telephone call.

8. A method to process a voice in a telephone call to an external sound localization point (SLP) that is familiar to a user, the method comprising:
receiving, at a smartphone, the telephone call that will externally localize to the user as binaural sound;
determining, by the smartphone and based on analysis of prior telephone calls, a preferred SLP that is familiar to the user where the user previously localized voices in the prior telephone calls; and
processing, with a processor in the smartphone, the voice in the telephone call so the voice plays through earphones or headphones and externally localizes to the user at the preferred SLP that is familiar to the user, wherein the preferred SLP is at a far field distance from the user.

9. The method according to claim 8 further comprising:
storing, in memory of the smartphone, the preferred SLP where the user desires to localize the voice in the telephone call.

10. The method according to claim 8 further comprising:
prefetching, by the smartphone, head-related transfer functions (HRTFs) that are processed with the voice in order to increase execution speed of processing the voice in the telephone call into the binaural sound.

11. The method according to claim 8 further comprising:
receiving, at the smartphone, a telephone call from an unknown telephone number;
retrieving, by the smartphone, an SLP assigned to unknown telephone numbers; and
processing, with the processor, sound from the unknown telephone number to localize to the SLP assigned to unknown telephone numbers.

12. The method according to claim 8 further comprising:
consulting, by the smartphone, historic information stored in memory to determine where to localize the voice in the telephone call, wherein the historic information includes telephone numbers, SLPs for the telephone numbers, and head-related transfer functions (HRTFs) assigned to the telephone numbers.

13. The method according to claim 8 further comprising:
storing, in memory of the smartphone, user preferences of the user that include locations in spherical coordinates where the user previously externally localized the voices in the prior telephone calls.

14. The method according to claim 8 further comprising:
assigning, by the smartphone, head-related transfer functions (HRTFs) to telephone numbers;
determining, by the smartphone, a telephone number of an incoming telephone call;
selecting, by the smartphone, a pair of the HRTFs that are assigned to the telephone number of the incoming call; and
processing, by smartphone, the incoming telephone call with the pair of the HRTFs that are assigned to the telephone number of the incoming call.

15. The method according to claim 8 further comprising:
caching, in memory of the smartphone, head-related transfer functions (HRTFs) that process the voice in order to increase execution speed of processing the voice in the telephone call to the user.

* * * * *